United States Patent [19]

Kuwazima et al.

[11] Patent Number: 4,770,384
[45] Date of Patent: Sep. 13, 1988

[54] MOVABLE STAND

[75] Inventors: Takashi Kuwazima; Toshinori Tanaka; Noriyuki Yamada; Akio Kato; Masao Okada, all of Kadoma, Japan

[73] Assignee: Matsushita Electric Works, Ltd., Japan

[21] Appl. No.: 69,222

[22] Filed: Jul. 2, 1987

[30] Foreign Application Priority Data

Jul. 28, 1986 [JP] Japan .............................. 61-115725[U]
Apr. 25, 1987 [JP] Japan .................................. 62-102602

[51] Int. Cl.⁴ .............................................. E04G 3/00
[52] U.S. Cl. ................................ 248/281.1; 248/280.1; 248/282; 248/289.1; 362/402; 362/413
[58] Field of Search ................... 248/281.1, 280.1, 282, 248/283, 289.1; 362/402, 413

[56] References Cited

U.S. PATENT DOCUMENTS

| | | | |
|---|---|---|---|
| 975,070 | 11/1910 | Richardson et al. ................ 248/282 |
| 3,243,497 | 3/1966 | Kendall et al. .................. 248/282 X |
| 3,374,347 | 3/1968 | Hirose ............................ 248/284 X |
| 4,080,530 | 3/1978 | Krogsrud ..................... 248/280.1 X |
| 4,160,536 | 7/1979 | Krogsrud ......................... 248/280.1 |
| 4,166,602 | 9/1979 | Nilsen et al. ..................... 248/280.1 |
| 4,213,172 | 7/1980 | Scattolin et al. ................ 362/402 X |
| 4,447,031 | 5/1984 | Sounder et al. ............. 248/281.1 X |
| 4,494,177 | 1/1985 | Matthews ........................... 362/402 |
| 4,545,555 | 10/1985 | Koch ................................. 248/280.1 |
| 4,651,966 | 3/1987 | Suzuki ............................. 248/282 X |

FOREIGN PATENT DOCUMENTS 0989131 9/1951 France ................................. 248/282
0995170 6/1965 United Kingdom ................ 362/402

Primary Examiner—Ramon O. Ramirez
Attorney, Agent, or Firm—Stevens, Davis, Miller & Mosher

[57] ABSTRACT

An improved movable stand has a parallel crank arm assembly which includes a pair of parallel arm members and first and second brackets positioned at opposite ends of said arms. Each of the parallel arm members is pivoted at its ends to their adjacent brackets to thereby define a parallel crank. One of the arm members is shaped into a tubular configuration in order to enclose therein the other arm member, whereby the movable stand can have a single-arm-like appearance of aesthetic appeal.

23 Claims, 24 Drawing Sheets

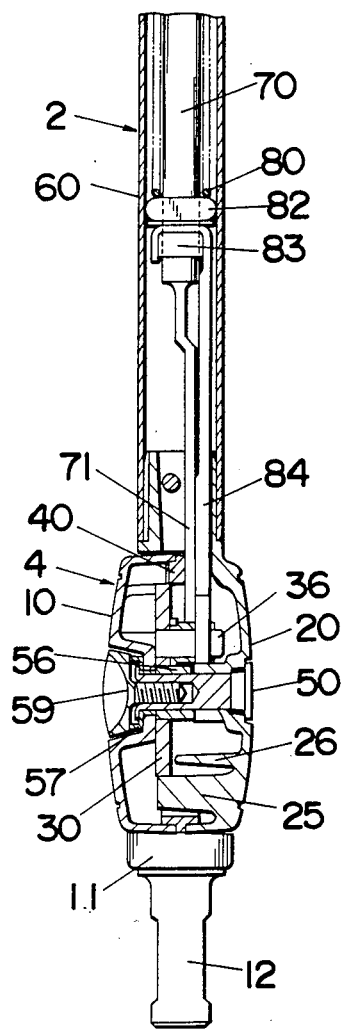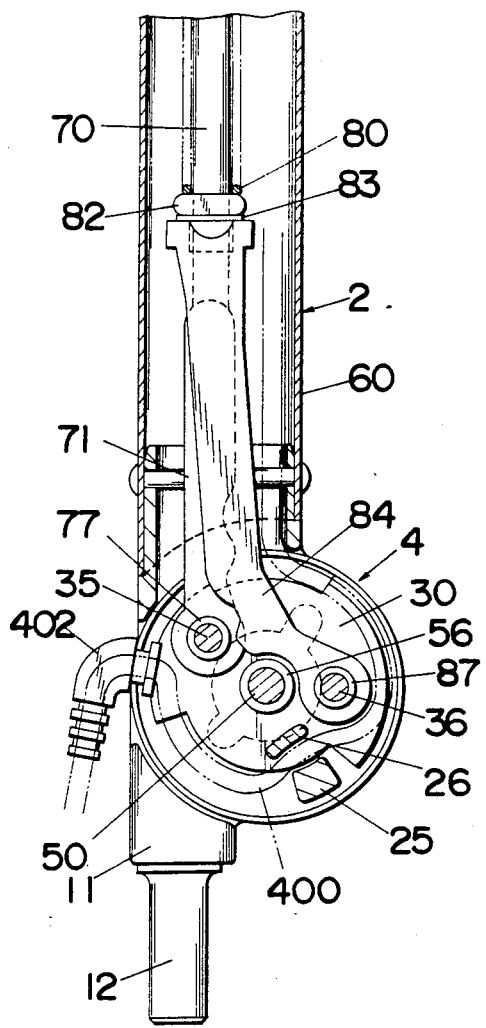

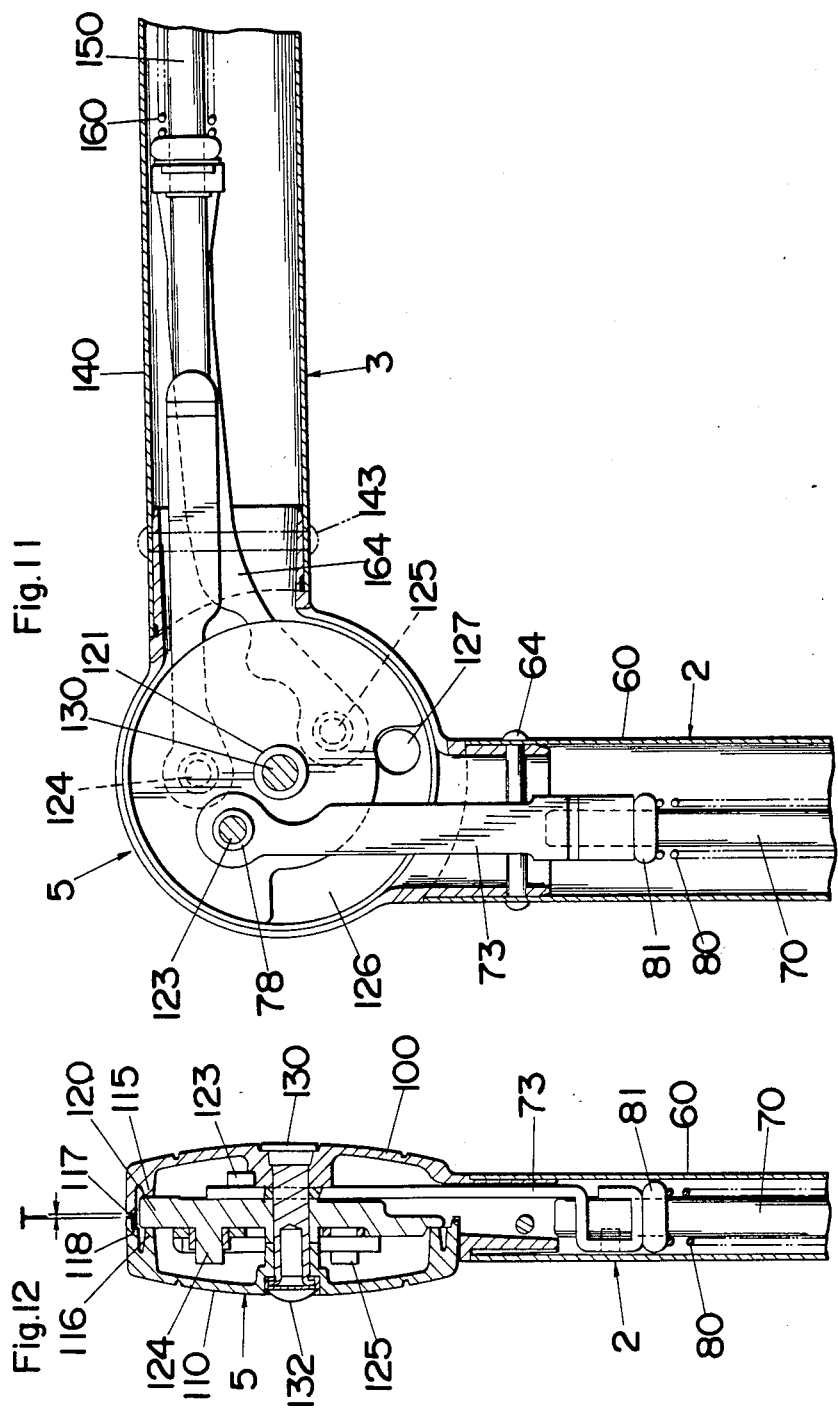

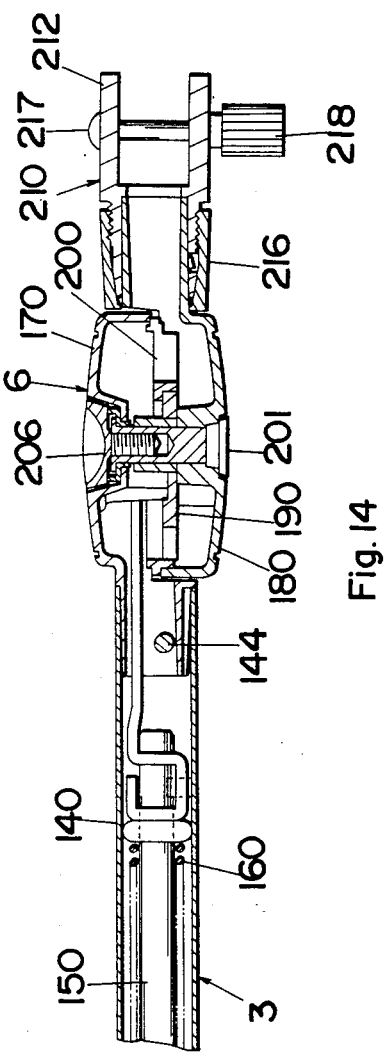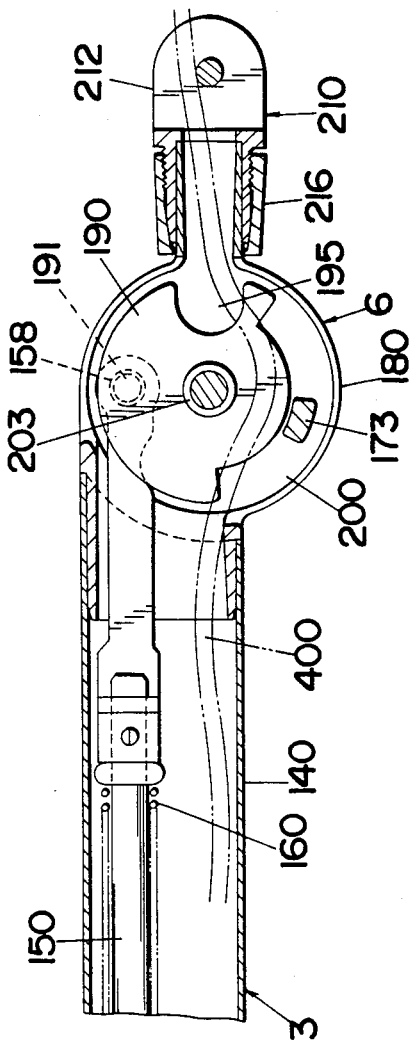

MOVABLE STAND

BACKGROUND OF THE INVENTION

1. Field of the Invention

The present invention relates to a movable stand employing a parallel crank arm mechanism, and more particularly to such a movable stand in which one of the parallel arm members is shaped into a tubular configuration in order to conceal therein the other parallel arm member.

2. Description of the Prior Art

Movable stands employing a parallel crank arm mechanism have been conventionally utilized for carrying head units of devices such as lamps or book holders to be installed adjacent desks, beds or the like places. Such movable stands are disclosed in U.S. Pat. Nos. 4,080,530, 4,160,536, 4,165,530 and 4,213,172, in each of which a pair of arm members forms a parallel crank in combination with a pair of brackets pivotally connected to both ends thereof, the parallel crank additionally including a spring which provides a counterbalancing effect upon the parallel crank. Any of these prior movable stands, however, employs a parallel crank of a primitive configuration such that the very structure of the parallelogram is explicitly exposed presenting a definite gap between two parallel arm members. A parallel crank having such a primitive configuration inherently accompanies the character that the gap width varies as the parallel crank swings. The gap width practically reaches its maximum where the parallel crank arm extends in the vertical direction and is gradually reduced with increase of reclining angle to its minimum where the parallel crank extends in the horizontal direction. Due to this variable nature in the width of the exposed gap during the swing motion of the parallel crank, there is a constant danger of pinching a user's fingers between the two parallel arm members when he or she is trying to adjust the angular position of the movable stand from an upright position to a horizontal position with the attendant narrowing of the gap. In addition to this fatal drawback, the primitive configuration of the parallel crank arm with the exposed gap may, in most instances, give a clumsy appearance. Furthermore, this unfavorable factor is emphasized when the gap between the two arm members is selected to be greater for preventing the danger of finger entrapment.

SUMMARY OF THE INVENTION

The present invention eliminates the above problems inherent to the prior art movable stands and provides an improved movable stand. A movable stand in accordance with the present invention comprises at least one parallel crank arm assembly which includes a pair of parallel arms and a pair of brackets for pivotally connecting both ends of the arm to form a parallel crank. When another parallel crank arm assembly is cooperatively employed to provide a double-arm structure, the adjoining two parallel crank arm assemblies are articulated through a common bracket. One of the arm members constituting each parallel crank arm assembly is shaped into a tubular configuration for totally enclosing therein the other arm member in order to conceal the latter arm member within the length of the former tubular arm member. With this configuration, the parallel crank arm assembly presents a single-arm-like structure realizing an aesthetic appeal and at the same time giving no externally accessible gap between the arm members which would be otherwise the cause of undesirable finger entrapment.

Accordingly, it is a principal object of the present invention to provide a movable stand which eliminates the danger of finger entrapment and as well provides an aesthetically pleasing appearance.

The movable stand may further comprise spring means for counterbalancing the arm assembly to maintain it at any desired angular positions. The spring means is enclosed within the tubular arm member of the crank arm assembly together with the other arm member, thereby successfully concealing the counterbalancing spring means within the arm structure.

It is therefore another object of the present invention to provide a movable stand of which counterbalancing means can be hidden within the arm structure, contributing to presenting a smart and stylish design.

In a preferred form, the present invention comprises a first parallel crank arm assembly and a second parallel crank arm assembly. The first parallel crank arm assembly includes a first pair of parallel arms and first and second brackets positioned at opposite ends of the arms. A base is provided in association with the first bracket for supporting the first arm assembly. One of the first pair of arms is shaped into a tubular configuration which encloses therein the other of the first pair of arms in order to conceal the other arm within the length of the one tubular arm. The second parallel crank arm assembly includes a second pair of arms pivotally connected at one ends to the second bracket common to the first arm assembly and includes a third bracket pivotally connected to the other ends of the second pair of arms whereby defining a second parallel crank. An end attachment is held on the third bracket for mounting an object. One of the second pair of arms is of tubular configuration which encloses therein the other of the second pair of arms in order to conceal the latter arm within the length of the former tubular arm in a like manner as in the first arm assembly. The first bracket comprises a disc and a pair of opposed cup-shaped members which are shaped as the respective extensions of the one tubular arm and of the base. The disc is fixed to the base through the associated cup-shaped member and carries a first pivot pin for pivotal connection with the other arm. The opposed cup-shaped members are coaxially coupled to be relatively rotatable with each other through a second pivot pin which also provides for the pivotal connection between the one tubular arm and the disc. With this result, the first arm assembly can be articulated to the base by better utilization of the second pivot pin essential for the first parallel crank itself. Further, with the above provision of the cup-shaped members as the respective extensions of the tubular arm and of the base, particularly the tubular arm responsible for the single-arm-like appearance can be movable together with the associate cup-shaped member about the second pivot pin relative to the other cup-shaped member of the base, leaving substantially no obtrusive break between the first assembly and the first bracket. In the like manner, the second bracket comprises a second disc and a second pair of opposed cup-shaped members which are respectively the extensions of the tubular arm of the first arm assembly and the tubular arm of the second arm assembly. This second pair of cup-shaped members is coupled to each other through a pivot pin which is common to the first and second crank arm assemblies such that the second arm assembly is pivotable together with the associated cup-shaped member about that common pivot pin relative to the first arm assembly.

It is therefore a further object of the present invention to provide a movable stand in which the first arm assembly can be conveniently articulated to the base and to the second arm assembly through the well-designed brackets, enabling to provide a simple profile between the junctures of the arm assemblies and the adjacent bracket.

The present invention further discloses aspects and advantages in incorporating other associated components in well-arranged fashion within the structure of the movable stand for providing a smart and stylish design thereto.

The above and still other objects of the present invention can be appreciated more from the following detailed description in conjunction with the attached drawings.

BRIEF DESCRIPTION OF THE DRAWINGS

FIGS. 4 and 5 are respectively a front sectional view and a side sectional view of the bottom bracket and the adjacent portion of movable stand;

FIGS. 11 and 12 are respectively a front sectional view and a side sectional view of the middle bracket and the adjacent portions of the movable stand;

FIGS. 14 and 15 are respectively a front sectional view and a side sectional view of the top bracket and the adjacent portion of the movable stand;

DETAILED DESCRIPTION OF THE PREFERRED EMBODIMENTS

First embodiment <FIGS. 1 to 25>

Figure 1:
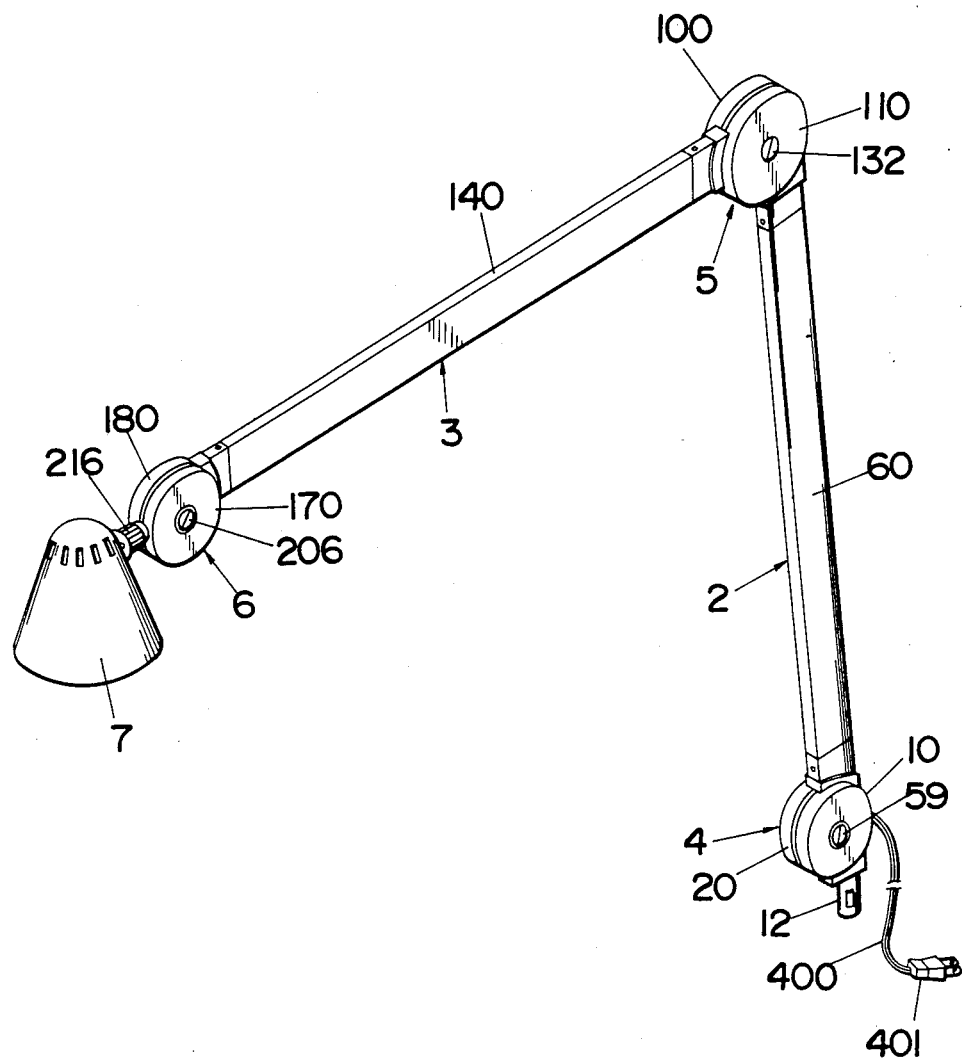
FIG. 1 is a perspective view of a movable stand in accordance with a first embodiment of the present invention.
Figure 2:
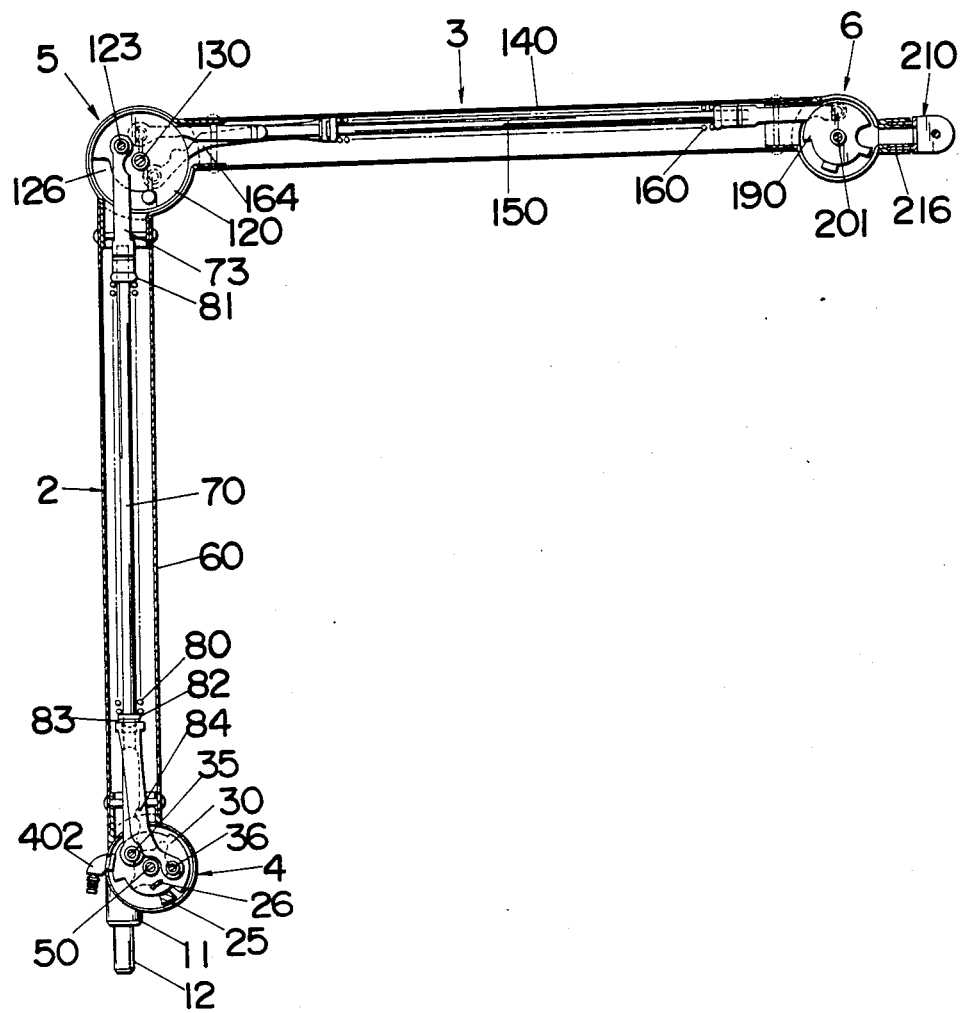
FIG. 2 is a front sectional view of the movable stand.
Figure 3:
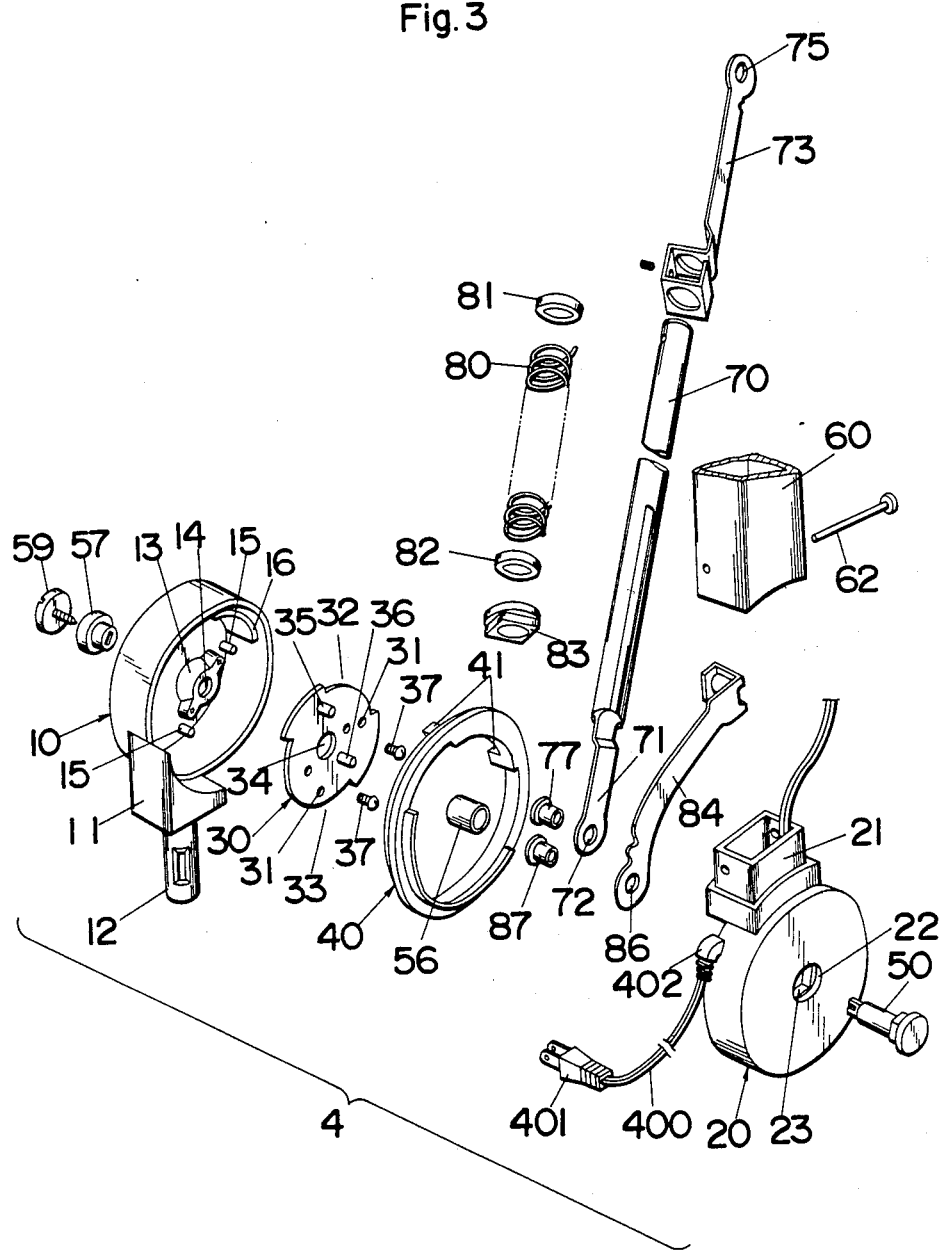
FIG. 3 is an exploded perspective view of a bottom bracket and its associated parts employed in the movable stand.

Referring firstly to FIG. 1, a movable stand in accordance with a first embodiment includes first and second arm assemblies 2 and 3 which are articulated to each other through a middle bracket 5. The lower end of the first arm assembly 2 is connected by means of a bottom bracket 4 to a mounting stem 12 which defines a swivel pivot with a suitable mount base (not shown). The upper end of the second arm assembly 3 is connected through a top bracket 6 to a lamp unit 7. An electric cord 400 with a plug 401 is routed through the inside of the movable stand to supply electric power to lamp unit 7. As depicted in FIGS. 2 and 3, the first arm assembly 2 consists basically of an outer arm 60 of tubular configuration and an inner arm rod 70 which are pivoted at their respective ends to bottom and middle brackets 4 and 5 to form a first parallel crank. Likewise, the second arm assembly 3 consists basically of an outer arm 140 of tubular configuration and an inner arm rod 150 which are pivoted at their respective ends to middle and top brackets 5 and 6 to form a second parallel crank. In each of the first and second arm assemblies, a counterbalancing spring 80 and 160 is disposed around inner arm rod 70 and 150 for providing counterbalancing effect upon each parallel crank arm assembly.

Figure 6:
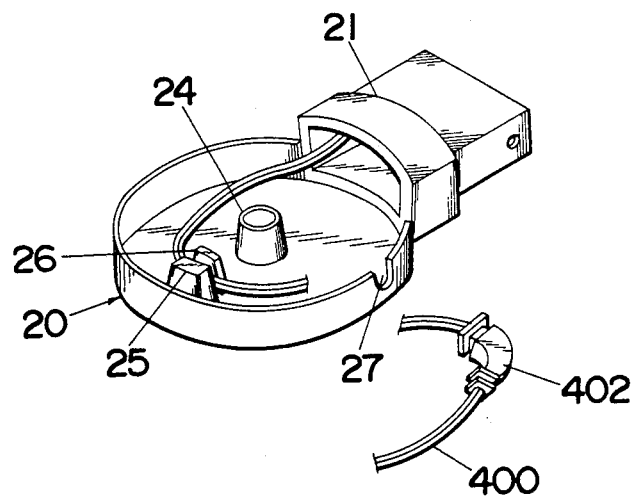
FIG. 6 is a perspective view showing one of cup-shaped members forming the bottom bracket.

Reference is now made to FIGS. 3 to 5 for discussing in detail the connection between bottom bracket 4 and the first arm assembly 2. Bottom bracket 4 comprises a disc 30 and a first pair of opposed cup-shaped bracket members 10 and 20 which have generally circular outer configuration and enclose therebetween disc 30. One bracket member 10 is shaped to integrally includes an extension 11 with mounting stem 12 projecting outwardly therefrom. Integrally formed on the inner surface of bracket member 10 are a center boss 13 with an opening 14, a pair of studs 15 and an arcuate projection 16 extending along the inner periphery of the surrounding wall. The other bracket member 20 integrally includes a coupling sleeve 21 projecting outwardly for connection with outer tubular arm 60 of the first arm assembly 2. Coupling sleeve 21 is inserted into the lower end of tubular arm 60 and secured thereto by a rivet 62 so that the other bracket member 20 is movable with outer tubular arm 60. A center opening 22 with a square cavity 23 is formed in the center of bracket member 20 to extend in a center boss 24 projecting inwardly to bracket member 20, as best shown in FIG. 6. Also formed interiorly of bracket member 20 is a stopper projection 25 for limiting the angular displacement of bracket member 20 relative to bracket member 10 to which disc 30 is fixed. Stopper projection 25 cooperates with an adjacent projection 26 to hold therebetween electric cord 400 which enters through a bushing 402 held in a notch 27 of the peripheral wall and extends upward through coupling sleeve 21.

Bracket disc 30 is attached to one bracket member 10 with studs 15 extending into holes in disc 30 and is secured thereto by screws 37 extending through apertures 31 in disc 30 and into center boss 13. Formed in the periphery of disc 30 are a pair of diametrically opposed cutouts 32 and 33, one for snugly receiving arcuate projection 16 and the other for receiving therein stopper projection 25 for allowing the above limited angular movement of bracket member 20 relative to the other bracket member 10. Projected on disc 30 are a pair of pivot pins 35 and 36 which are disposed generally oppositely of a center hole 34 and fit along with complementary eyelets 77 and 87 into eyes 72 and 86 respectively formed in the lower ends of inner arm rod 70 and a spring actuator bar 84 in order to pivotally support inner arm rod 70 and spring actuator bar 8 on disc 30.

Figure 7:
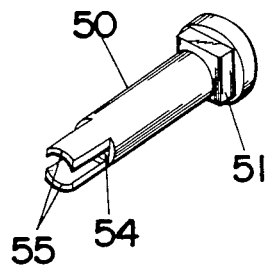
FIG. 7 is a perspective view of a center pin for coupling the cup-shaped members of the bottom bracket.
Figure 8:
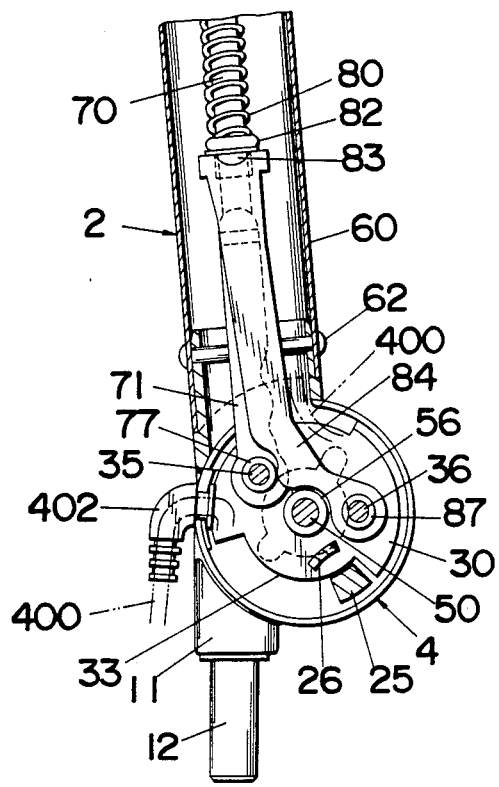
FIGS. 8 and 9 are front sectional views of the lower portion of the movable stand including the bottom bracket shown in its vertically extended position and horizontally extended positions, respectively.
Figure 9:
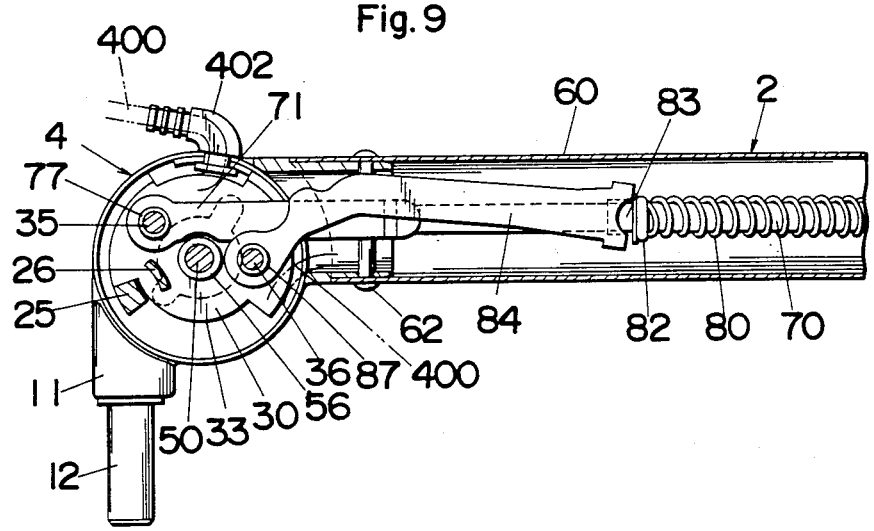

Bracket member 20, which is fixed to tubular arm 60 to be movable therewith, is coupled with bracket member 10 by a center pin 50 extending through center opening 22, a bearing sleeve 56 fitted in center hole 34 of disc 30, and opening 14 in bracket member 10. As shown in FIG. 7, center pin 50 is formed to have a square neck 51 adjacent its head and a bifurcated end 55 and have an internal thread 54. Square neck 51 is fitted in square cavity 23 of bracket member 20 to hold center pin 51 rotatable with bracket member 20, or outer tubular arm 60. An adjusting screw 59 with a slotted head is threadedly engaged with center pin 50 with its head seated in a cavity in the outer face of bracket member 10. Interposed between adjusting screw 59 and center pin 50 is a collar 57 with a flange which rests on the bottom of the cavity and on which bifurcated end 55 of pin 50 is pressedly turned for holding bracket members 10 and 20 together. It should be noted at this point that center pin 50 coaxially coupling the bracket members 10 and 20 are responsible for the pivotal connection of disc 30 or bottom bracket 4 to outer tubular arm 60 for completing the parallel arm crank of the first arm assembly, thus contributing to reducing the number of pivot pins necessary in the assembly. Further, all the components arranged for the pivotal connection of disc 30 to the associated members are concealed between bracket members 10 and 20 for providing a neat finish to the junction between bottom bracket 4 and outer tubular arm 60 featuring the outer appearance of the first arm assembly 2.

Interposed between the peripheral walls of bracket members 10 and 20 is a friction ring 40 with a pair of prongs 41 which are engaged on the opposite ends of arcuate projection 16 of bracket member 10 to be rotatably fixed thereto. Thus, friction ring 40 provides a friction coupling with the other bracket member 20 for exerting between bracket members 10 and 20 a friction force which is additive to the spring force expected from counterbalancing spring 80 for balancing the first arm assembly 2 and keeping it at a desired angular position about bottom bracket 4. This friction force can be easily adjusted by tightening or loosening adjusting screw 59 by means of a screw driver or like.

Figure 17:
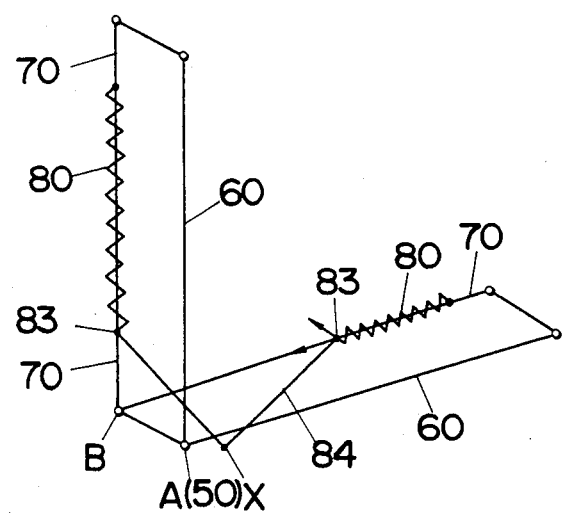
FIG. 17 is a diagram schematically illustrating the operation of a compression spring for counterbalancing the crank arm of the movable stand.
Figure 19:
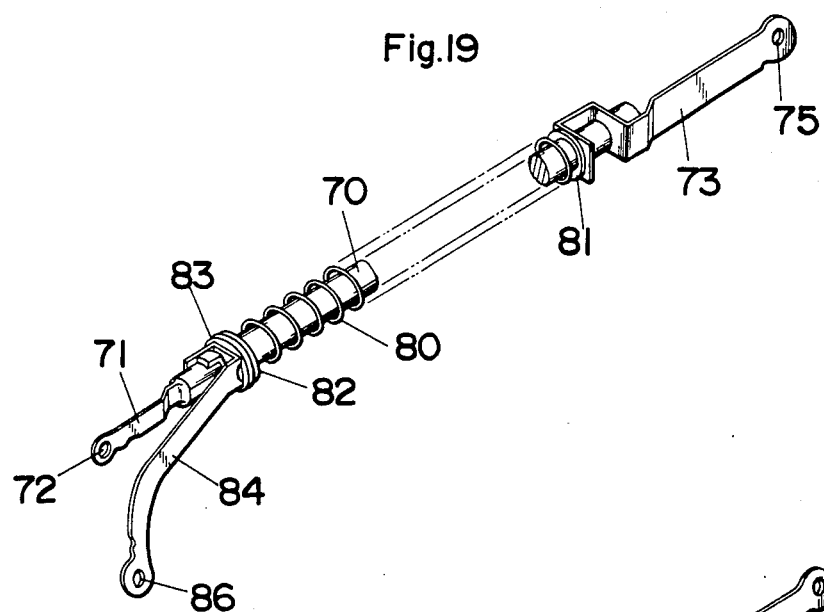
FIG. 19 is a perspective view of an inner arm and spring combination employed in the movable stand.

Inner arm rod 70 is composed of a rounded shank having a flat lower end 71 and an upper joint member 73 secured at its bottom to upper end of the shank by means of a bolt 76. Counterbalancing spring 80 which is a compression spring is placed around the rounded shank portion of inner arm rod 70 with its upper end held against the lower end of upper joint member 73 via a bushing 81. The lower end of spring 80 abuts via a bushing 82 against a slider 83 which is mounted on inner arm rod 70 to be slidable along the length of the rounded portion thereof, as best shown in FIGS. 3 and 19. Pivotally connected to slider 83 is the upper end of spring actuator bar 84 pivoted at its lower end to bottom disc 30 by means of pivot pin 36 and eyelet 87 extending into eye 86. Bar 84 has an apertured end into which the rounded portion of inner arm rod 70 loosely extends so that the upper end is movable with slider 83 while being pivoted thereto. As best shown in FIG. 17, when the first arm assembly 2 swings from its vertical position to a horizontal position, spring actuator bar 84 correspondingly pivots to push slider 83 along inner arm rod 70 to thereby compress spring 80, causing it to exert on the parallel crank structure a spring force counterbalancing the weight of the arm assembly and the associated object to be supported thereby. In this connection, it should be noted that, as clearly seen from FIG. 17, spring actuator bar 84 has its lower pivot axis X offset oppositely of the pivot axis A of outer tubular arm 60 from the pivot axis B of inner arm rod 70 so as to cross with the longitudinal axis of outer tubular arm 60 at such an angle of giving an increased compression rate of spring 80 as the crank arm swings downwardly.

The lower flat end 71 of inner arm rod 70 and the lower end of spring actuator bar 84 extending into the bottom bracket 4 are respectively flat shaped, as shown in FIGS. 3 to 5, to maintain the thickness of the bottom bracket 4 at a minimum. In this connection, the lower flat portion of spring actuator bar 84 is arcuately shaped with its convex located adjacent to inner arm rod 70 so as to overlap the upper portion thereof with inner arm rod 70, reducing the width dimension of outer tubular arm 60 to a minimum while ensuring enough space inside of outer tubular arm 60 for allowing electric cord 400 passing therethrough to be intact throughout the range of the swinging movement of arm assembly 2 between a generally upright position of FIG. 8 and a horizontal position of FIG. 9. It is noted at this point that the first arm assembly 2 is movable between the positions of FIGS. 8 and 9 in each of which stopper 25 integral with bracket member 20 and therefore movable with outer tubular arm 60 comes engaged with the corresponding edge of cutout 33 in disc 30. The inside diameter of spring 80 is slightly greater than the outside diameter of the rounded portion of inner arm rod 70 so that it can be compressed lengthwise thereof without accompanying substantial distortion in the lateral direction. Each of bushing 81 and 82 on the ends of spring 80 is kept in a sliding contact with the inner surfaces of the opposed walls of the shorter dimension of outer tubular arm 60, as best shown in FIG. 5, allowing spring 80 to be guided thereby along substantially a straight path during its compression stroke as well as serving to prevent the buckling of inner arm rod 70 in the repeated swinging movement of the arm assembly.

Figure 10:
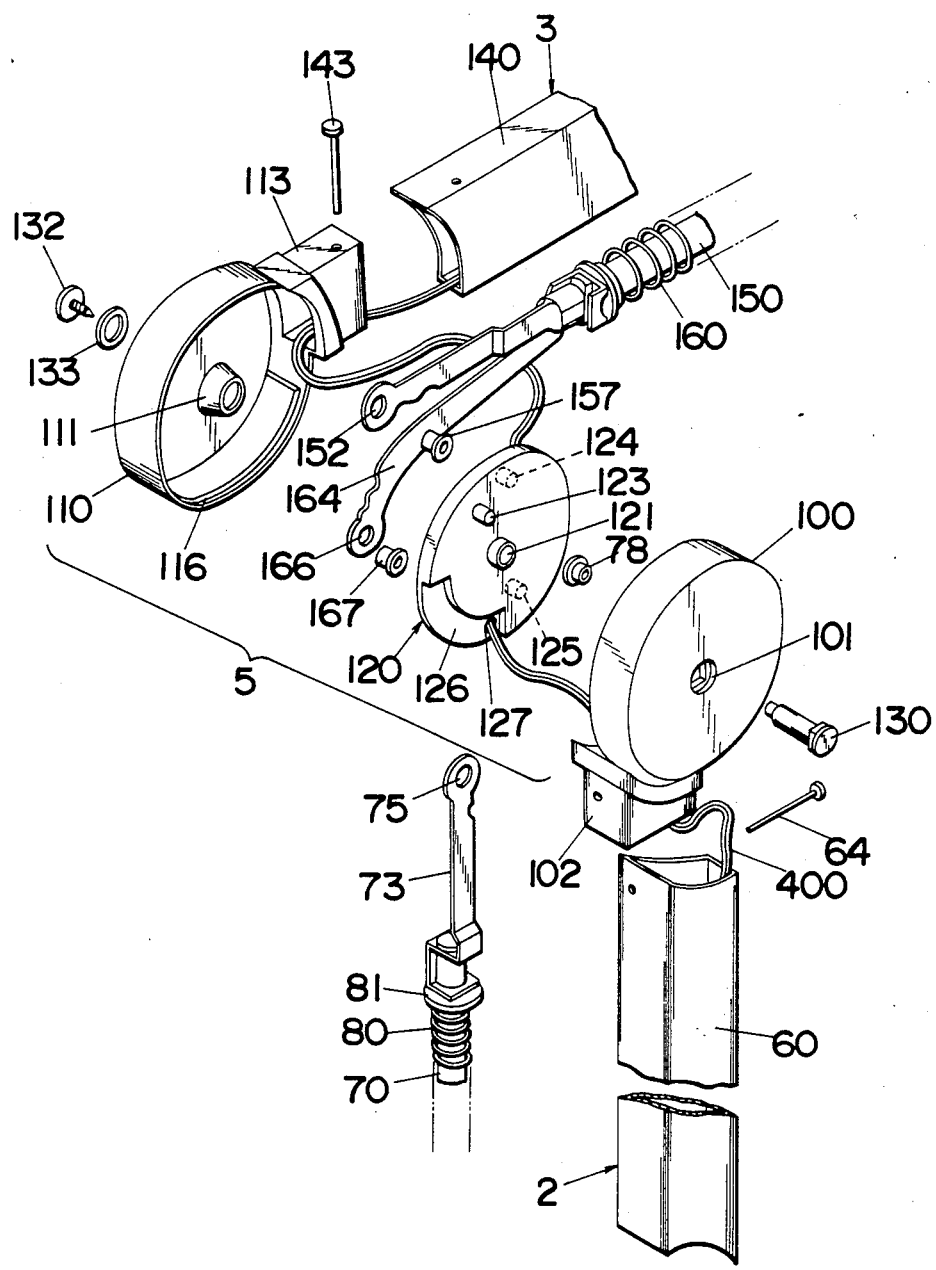
FIG. 10 is an exploded perspective view of a middle bracket and its associated parts employed in the movable stand.

Turning to FIGS. 10 to 12 illustrating the details of the connections of middle bracket 5 to the first arm assembly 2 and to the second arm assembly 3, middle bracket 5 comprises a second bracket disc 120 and a second pair of opposed cup-shaped bracket members 100 and 110 which have generally circular outer configuration and enclose therebetween disc 120. One bracket member 100 is shaped to integrally include a coupling sleeve 102 projecting outwardly therefrom for insertion into the upper end of outer tubular arm 60 of the first arm assembly 2. Sleeve 102 is secured to outer tubular arm 60 by a rivet 64 so that bracket member 100 is movable with outer tubular arm 60. Likewise, the other bracket member 110 is formed with a coupling sleeve 113 for coupling with outer tubular arm 140 of the second arm assembly 3 by means of a rivet 143.

Disc 120 is coaxially held between bracket members 100 and 110 by a center pin 130 extending through a center opening 101 in bracket member 100, a flanged center hole 121 in disc 120 and a center boss 111 of bracket member 110 to define a common pivot axis for outer tubular arm 60 of the first arm assembly 2 and as well for outer tubular arm 140 of the second arm assembly 3. Thus, the first and second arm assemblies 2 and 3 are allowed to swing or pivot about the common pivot axis defined by center pin 130. Disc 120 is formed on its one face with a pivot pin 123 which is received together with an eyelet 78 in an eye 75 at the upper end of inner arm rod 70 of the first arm assembly 2 for pivotal connection thereto. Formed on the other face of second disc 120 are a pair of generally diametrically opposed pivot pins 124 and 125 which are inserted together with eyelets 157 and 167 into corresponding eyes 152 and 166 at the lower ends of inner arm rod 150 and a spring actuator bar 164 for respective pivotal connection thereto. With the pivotal connections, disc 120 pivotally supports the upper end of the first parallel crank arm assembly 2 and the lower end of the second parallel crank arm assembly 3.

The center pin 130 has a square neck fitted in a correspondingly shaped cavity in center opening 101 to be movable with bracket 100. A screw 132 engages into an internal thread in the end of center pin 130 to hold bracket members 100 and 110 together. A washer 133 is interposed between the head of screw 132 and the bottom of a center recess formed in the outer surface of bracket member 110 as the counterpart of center boss 111. As shown in FIG. 12, disc 120 has its peripheral portion in frictional engagement respectively with arcuate ribs 115 and 116 each projecting interiorly of each of bracket members 100 and 110 in closely spaced relation with the peripheral wall thereof. Thus, disc 120 is rotatable relative to each of bracket members 100 and 110 with friction and is therefore floatingly supported between brackets members 100 and 110. The frictional force can be adjusted by screw 132 to be a moderate value so that middle bracket 5 act as a floating bracket ensuring a coherent movement of the first and second arm assemblies 2 and 3 throughout the range of the swinging movement thereof.

Bracket members 100 and 110 have their peripheral edges kept spaced by a small clearance T, as shown in FIG. 12, so as not to add another frictional coupling therebetween. However, a scheme is adopted so that the interior of middle bracket 5 can not be seen through clearance T. To this end, a fringe 117 projects from the periphery of bracket member 100 into a mating recess 118 in the periphery of the opposed bracket member 110 in such a manner as to intersect the clearance T without causing any direct frictional engagement therebetween.

Disc 120 has in its peripheral portion an arcuate recess 126 with a bore 127 at its one circumferential end so that electric cord 400 extending upwardly from outer tubular arm 60 is passed through bore 127 into outer tubular arm 140 of the second arm assembly 3 with the portion thereof being guided along actuate recess 126. The inner arm rod 150, spring actuator bar 164, compression spring 160 of the second arm assembly 3 have the identical constructions and functions to those of the first arm assembly 2 and therefore no further explanation thereof is deemed necessary.

Figure 13:
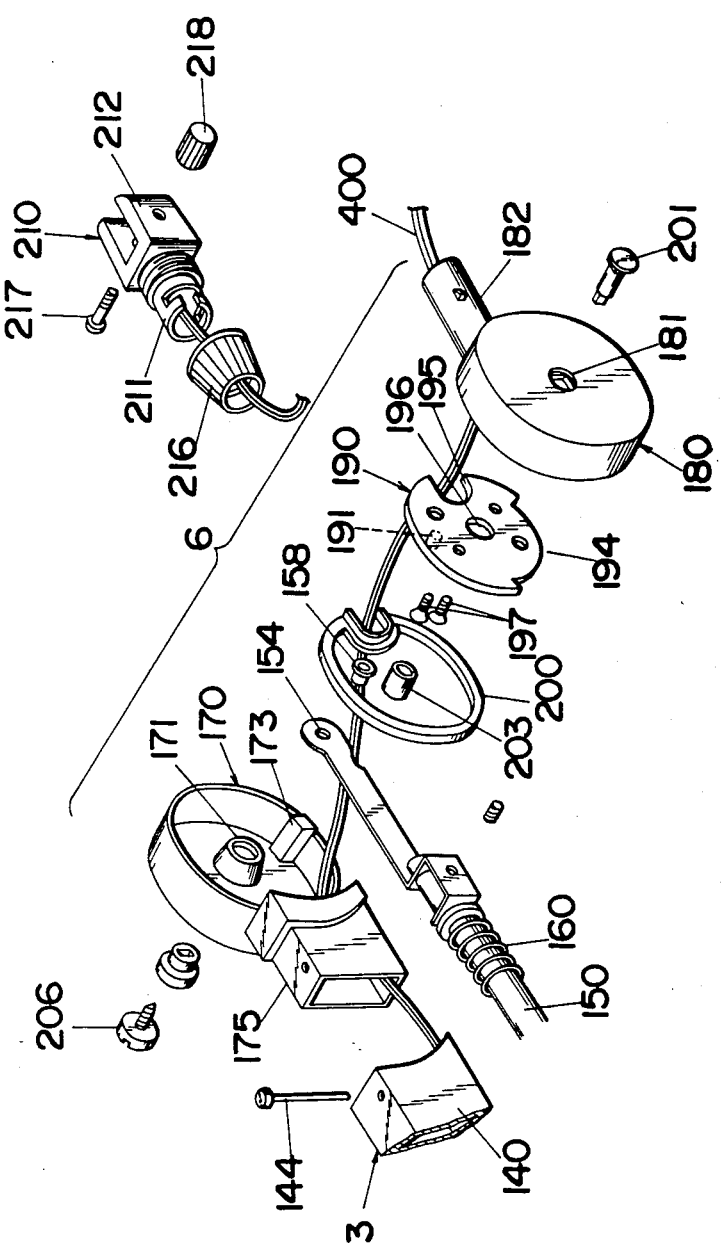
FIG. 13 is an exploded perspective view of a top bracket and its associated parts employed in the movable stand.

Referring to FIGS. 13 to 15, top bracket 6 comprises a third disc 190 and a third pair of opposed cup-shaped bracket members 170 and 180 which have generally circular outer configuration and enclose therebetween disc 190. Bracket member 170 has an integrally formed coupling sleeve 175 which is inserted into the upper end of outer tubular arm 140 of the second arm assembly 3 and secured thereto by a rivet 144 so that it is movable with outer tubular arm 140. The other bracket member 180 is formed with an integral prop 182 for connection to an end attachment 210 supporting lamp unit 7. Disc 190 is fixed to bracket member 180 by screws 197, in the same manner as in bottom bracket 4, and carries a pivot pin 191 radially outwardly of a center hole 196, which pin is received together with an eyelet 158 in an eye 154 at the upper end of inner arm rod 150 for pivotal connection thereto.

Bracket members 170 and 180 are held together with disc 190 interposed therebetween by means of a center pin 201, a bearing sleeve 203, and an adjusting screw 206 all of which are identical in structure and function to the corresponding parts 50, 56, and 59 in bottom bracket 4. Center pin 201 extends through a center opening 181 of bracket member 180, throug bearing sleeve 203 fitted in center hole 196 of disc 190, and through a center boss 171 of bracket member 170. A friction ring 200 held between the peripheries of brackets members 170 and 180 provides between bracket members 170 and 180 a friction coupling of which force can be adjusted for properly balancing the second arm assembly 3 and lamp unit 7 supported thereby in addition to the effect of counterbalancing spring 160. A stopper 173 integrally projecting inside of bracket member 170 is cooperative with an arcuate notch 194 in the periphery of disc 190 to limit the angular movement of bracket member 180 mounting lamp unit 7 with respect to bracket member 170 or the second arm assembly 3. Electric cord 400 extending out of outer tubular arm 140 is further routed through a notch 195 in disc 190, through prop 182, and through end attachment 210 to lamp unit 7.

End attachment 210 includes a hinge joint 212 with an externally threaded pipe 211 which is rendered contractible in diameter. As shown in FIGS. 14 and 15, pipe 211 will tightly grip prop 182 inserted therein upon tightening of a tapered nut 216 on pipe 211 for secure connection to top bracket 6. Hinge joint 212 has a set of bolt 217 and nut 218 for mounting lamp unit 7.

Figure 16:
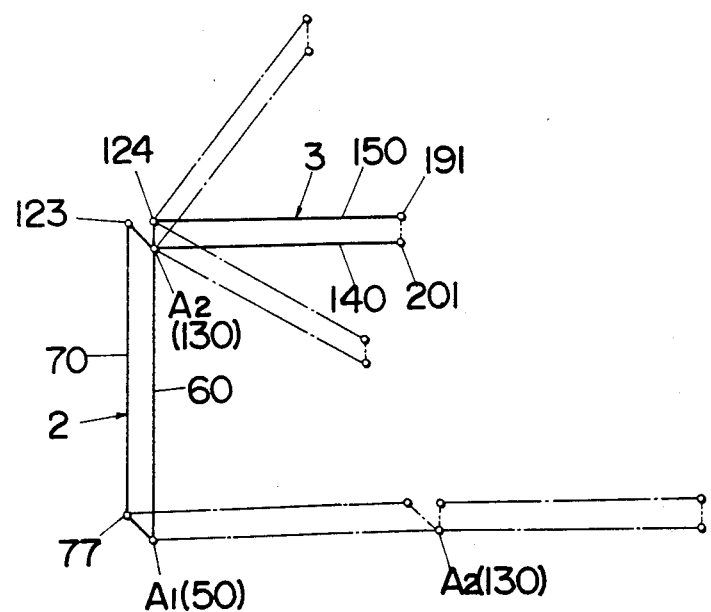
FIG. 16 is a diagram schematically illustrating the operation of the parallel crank arms of the movable stand.
Figure 18:
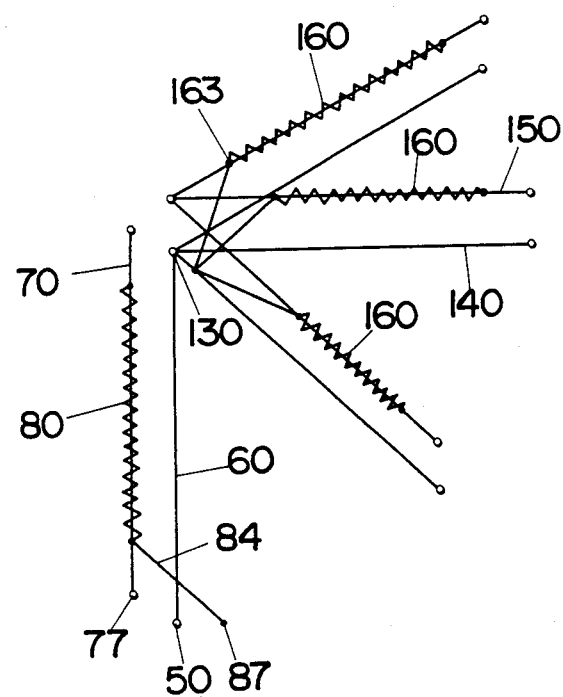
FIG. 18 is a diagram similar to FIG. 17 but additionally illustrating the counterbalancing operation of a compression spring associated with the upper arm of the movable stand.

As schematically shown in FIG. 16, in the movable stand thus constructed, the first and second arm assemblies 2 and 3 are allowed to swing in association with each other into positions indicated by solid and dotted lines while pivoting about corresponding pivot axes A1 and A2 defined by center pins 50 and 130, respectively. In FIG. 18 which is similar to FIG. 17, there is shown how compression spring 160 is compressed as the second arm assembly 3 swings downwardly to effect a counterbalancing effect thereon.

Figure 20:
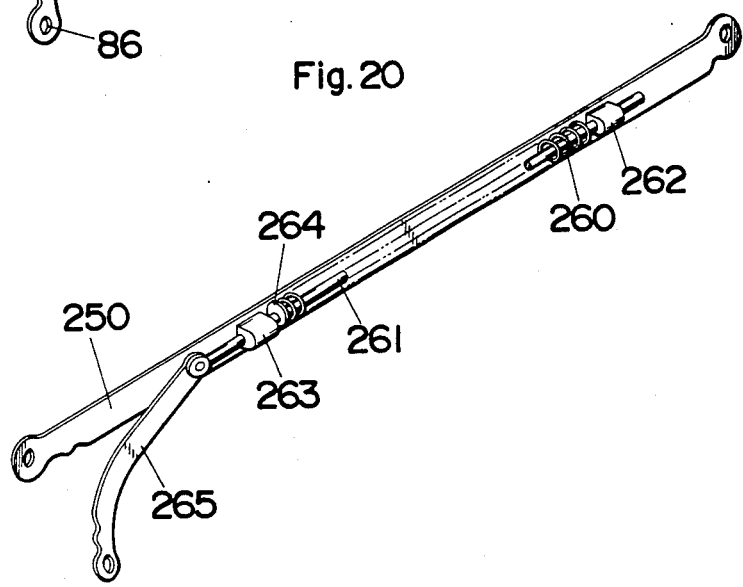
FIG. 20 is a perspective view of another inner arm and spring combination as a first alternative to the combination of FIG. 19.
Figure 21:
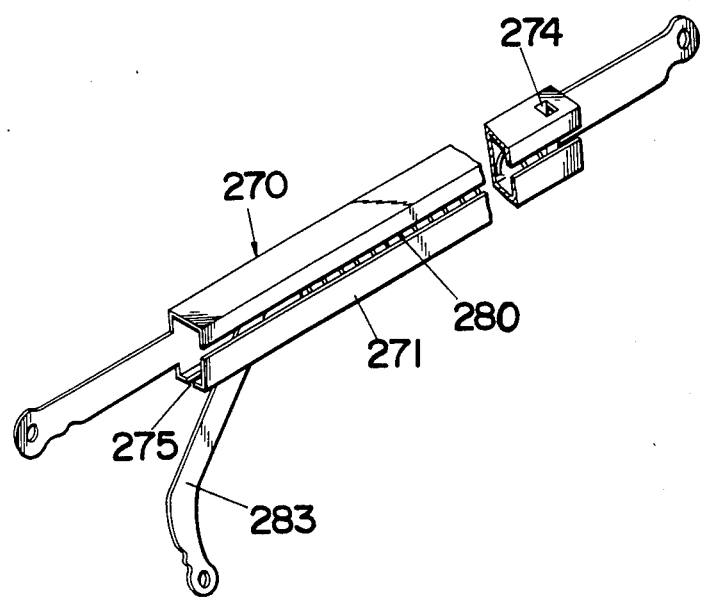
FIG. 21 is a perspective view of yet another inner arm and spring combination as a second alternative to the combination of FIG. 19.
Figure 22:
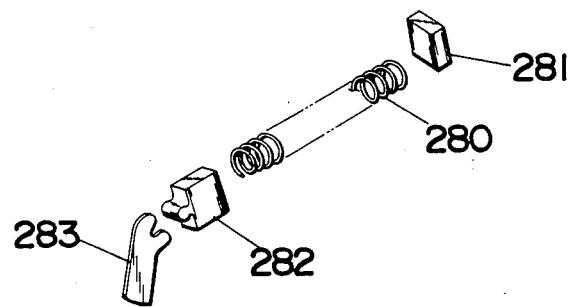
FIG. 22 is a perspective view of the detail of the spring placement in the inner arm of FIG. 21.

FIGS. 20 and 21 shows respectively other forms of inner arm and spring combinations which may be substituted for the combination of FIG. 19. The combination of FIG. 20 includes a flat shaped inner arm bar 250 with a pair of bearing blocks 262 and 263 mounted in longitudinally spaced relation on one side thereof. A shaft 261 extends in parallel relation with inner arm bar 250 through bearing blocks 262 and 263 to be slidably supported thereby. A compression spring 260 is placed on shaft 261 with its one end held against bearing block 262 and with the other end held against a bushing 264 fixed to shaft 261 inwardly of the other bearing block 263. Th end of shaft 261 adjacent bushing 264 is pivoted to one end of a spring actuator bar 265 so that spring actuator bar 265 pushes shaft 261 and bushing 264 thereon in the direction of compressing spring 260 when it is caused to pivot about the other end during the downward swinging movement of the corresponding arm assembly, giving rise to the same counterbalancing effect. In the combination of FIG. 21, an inner arm 270 is formed along the middle portion thereof with an integral sheath 271 for accommodating therein a compression spring 280. Also received within sheath 271 are a stop pad 281 and a shoe 282 between which spring 280 is compressed, as shown in FIG. 22. Stop pad 281 is held against an inward projection 274 at one end of sheath 171 while shoe 282 is held slidably along the length of the same. A spring actuator bar 283 has its portion extended through a slit 275 into sheath 271 where it is pivotally connected to shoe 282 so that it pushes shoe 282 to compress spring 280 when it pivots about the other end during the downward swinging movement of the arm assembly.

Figure 23:
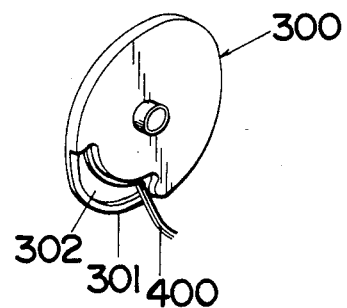
FIG. 23 is a perspective view of a disc which may be substituted for the disc of the above middle bracket.

FIG. 23 shows a modified form of a bracket disc 300 which may be substituted for disc 120 of middle bracket 5. Disc 300 is formed with an elongated slot 302 extending in a correspondingly arcuate recess 301 in the peripheral portion of disc 300. Slot 302 is for receiving electric cord 400 and allows it to be freely movable therein, which is effective for protecting cord 400 from being damaged during the articulated movement of the adjacent arm assemblies in relation to disc 300. In the figure, disc 300 is illustrated without associated pivot pins for the sake of simplicity only.

Figure 24:
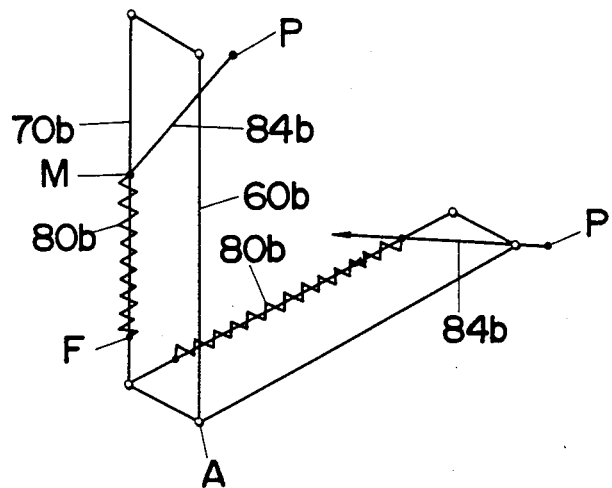
FIG. 24 is a diagram schematically illustrating another counterbalancing mechanism with a tension spring adaptable to the crank arm of the above movable stand.

FIG. 24 schematically shows a modified form of a counterbalancing mechanism applicable to either of the first or second crank arm assembly of the present invention. In this modification, a tension spring 80b is employed instead which has its one end fixed at F to the lower end of an inner arm member 70b and has the other end M rendered slidable along the length thereof. The other end M of spring 80b is pivotally connected to one end of a spring actuator 84b which extends at an angle with respect to the longitudinal axis of an outer tubular arm 60b and is pivotally supported at P to an associated bracket (not shown). With this arrangement, when the crank arm assembly swings downwardly about a pivot A, spring actuator 84b is caused to pivot about P in the clockwise direction in the figure, expanding spring 80b so as to provide a counterbalancing effect upon the crank arm assembly.

Figure 25:
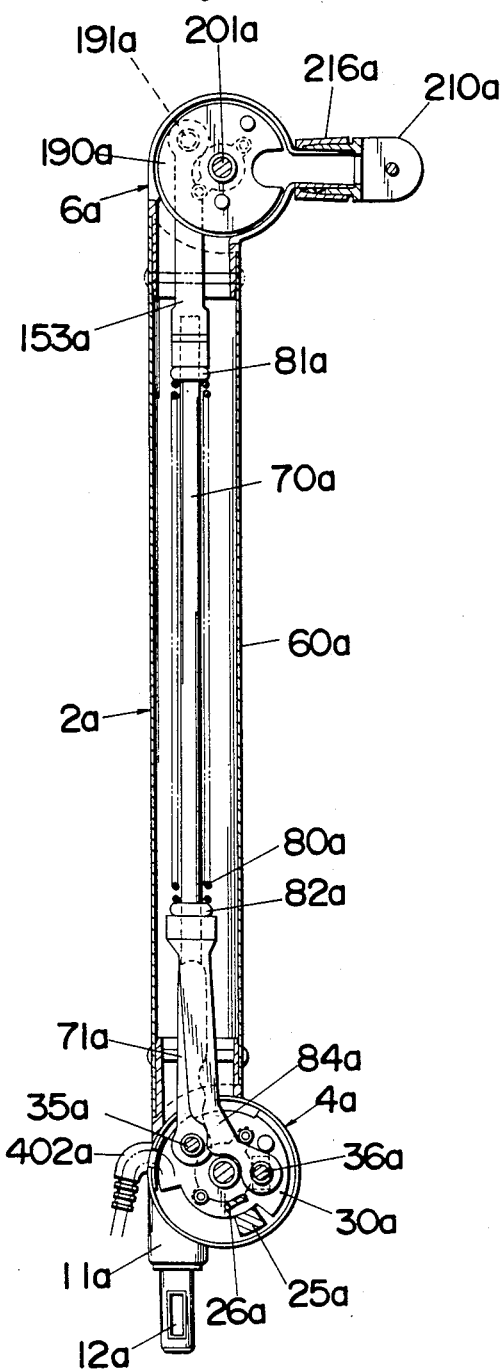
FIG. 25 is a front sectional view of a movable stand of single-arm construction in accordance with a modification of the first embodiment.

The above-mentioned movable stand of double-arm structure can be readily modified into a movable stand of a single-arm structure as shown in FIG. 25. This movable stand has such a construction that the upper arm assembly and the middle bracket are eliminated from the previous embodiment while the top bracket thereof is directly connected to the lower arm assembly. Practically, this modification is in a substantial correspondence to the lower arm assembly of the above embodiment in regard of its construction and function. For this reason and for the sake of clarity, the constituent parts of the modification are designated by the same numeral as the counterparts of the above first embodiment except for the accompaniment by the small letter of (a). As is obvious from the relationship between the double-arm structure and the single-arm structure, the number of the crank arm assemblies can be arbitrarily selected in designing the movable stand with corresponding number of middle brackets.

Second embodiment <FIGS. 26 to 41>

Figure 26:
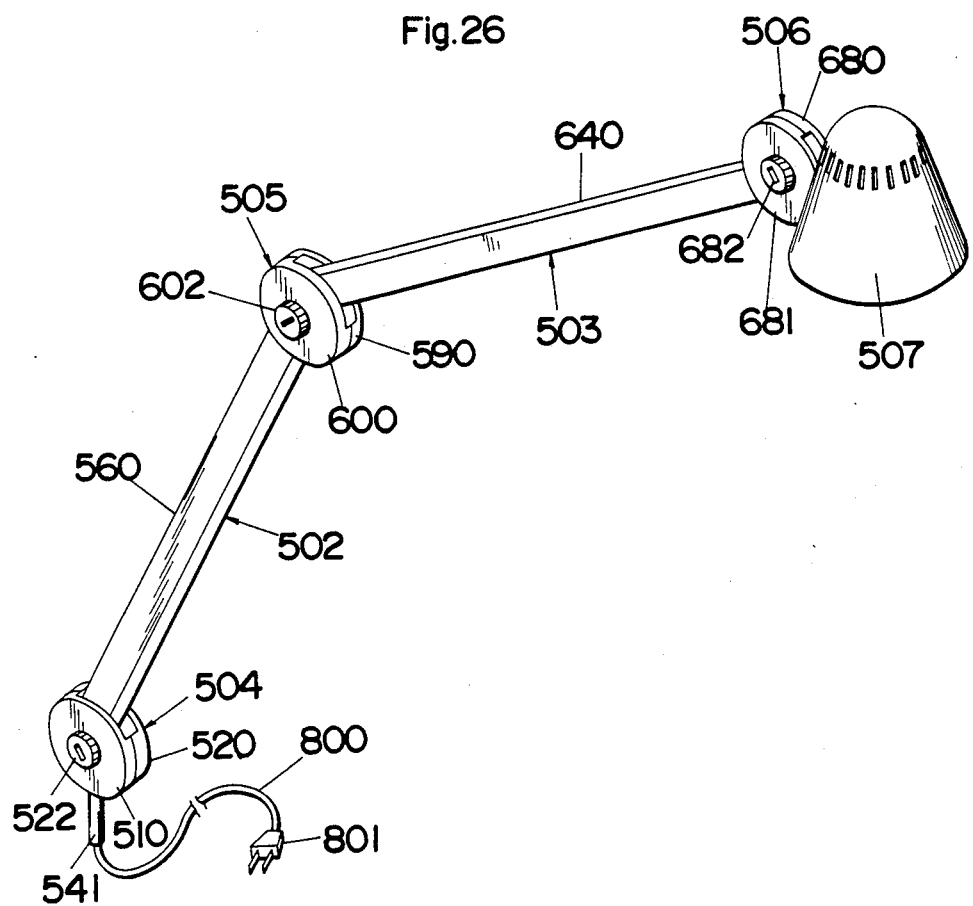
FIG. 26 is a perspective view of a movable stand in accordance with a second embodiment of the present invention.

We now turn to a second embodiment of the present invention with reference to FIG. 26. A movable stand of the second embodiment includes first and second arm assemblies 502 and 503 which are articulated through a middle bracket 505. The lower end of the first arm assembly 502 is articulated through a bottom bracket 504 to a mounting stem 541 which cooperates with a base member (not shown) to provide a swivel support. The upper end of the second arm assembly 503 is articulated through a top bracket 506 to a lamp unit 507. An electric cord 800 with a plug 801 is routed inside through the entire length of the movable stand to supply electric power to lamp unit 507.

Figure 27:
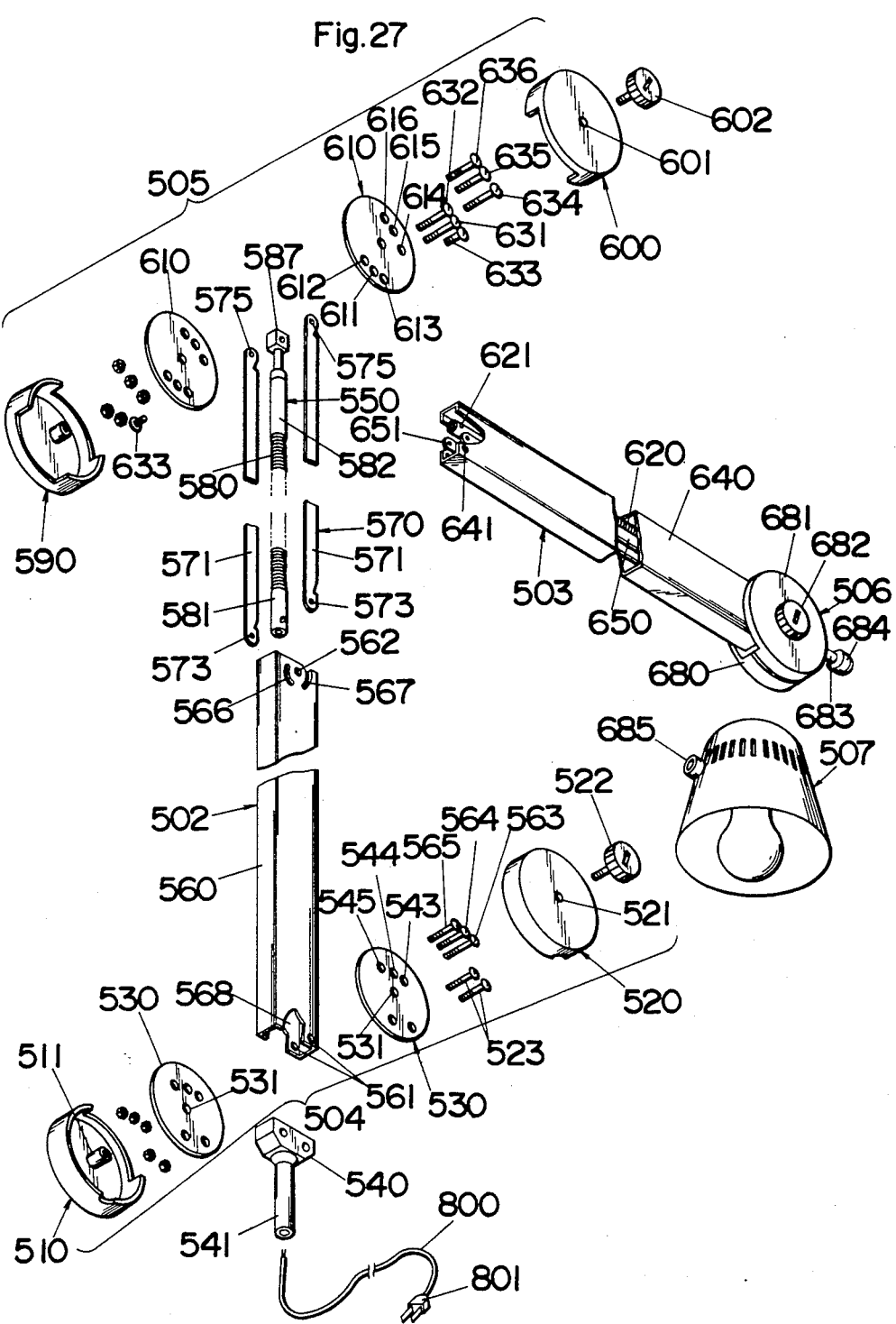
FIG. 27 is an exploded perspective view of the movable stand of FIG. 26.
Figure 28:
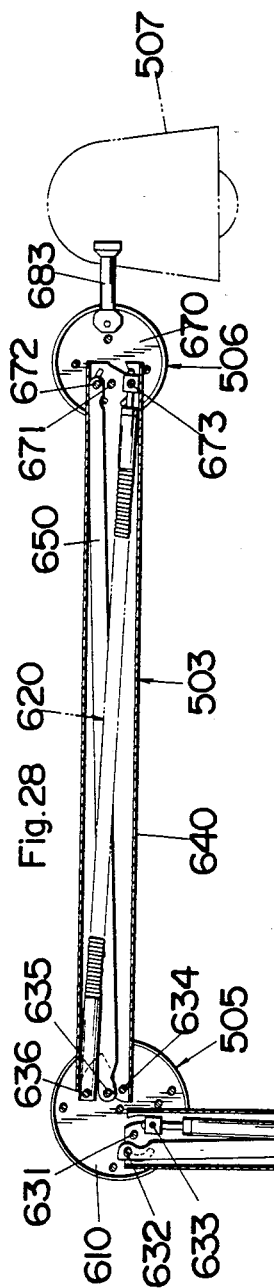
FIG. 28 is a front sectional view of the movable stand.
Figure 29:
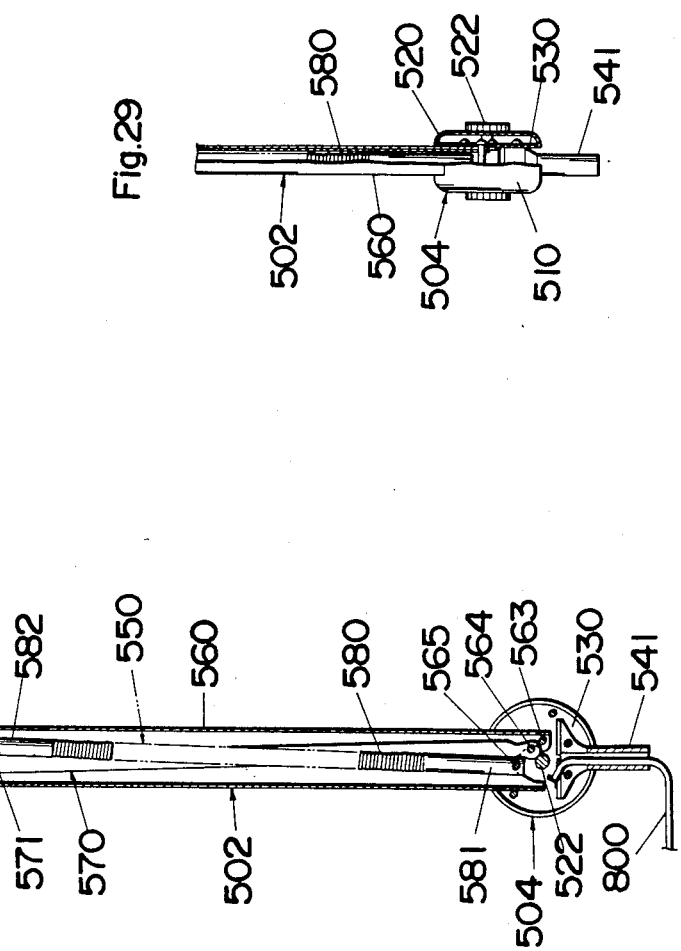
FIG. 29 is a partial side sectional view of a lower portion of the movable stand.

Detailed construction of the movable stand will be explained with reference to FIGS. 27 to 29. The first arm assembly 501 comprises an outer tubular arm 560 of rectangular cross section and an inner arm 570 composed of a pair of flat bars 571, which arms are pivotally supported at both ends to bottom bracket 504 and middle bracket 505. Likewise, the second arm assembly 503 comprises an outer tubular arm 640 and an inner arm 650 composed of a pair of flat bars, which arms are pivotally supported respectively to middle bracket 505 and top bracket 506. As seen from these figures, inner arms 570 and 650 are totally enclosed within the associated outer tubular arms 560 and 640 to be concealed therein.

The bottom bracket 504 comprises a pair of discs 530 which are enclosed between a pair of cup-shaped bracket covers 510 and 520. Bracket discs 530 are fastened together by an adjusting screws 522 with a base block 540 interposed between the lower portions thereof so that they are fixed to base block 540 with which integral stem 541 is integrally formed. It is the discs 530 that pivotally support the lower ends of outer and inner arms 560 and 570. For the pivotal connection, a pivot pin 563 extends through holes 543 in discs 530 and through bearing holes 561 in the lower corner end of outer tubular arm 560, while another pivot pin 564 extends through holes 544 in disc 530 and through a hole 573 in the lower end of each flat bars 571 forming inner arm 570. The latter pivot pin 564 passes through a bottom notch 568 of outer tubular arm 560. These pivot pins are fastened by a corresponding set of nuts. The lower end portion of outer tubular arm 560 is held between the upper half portions of the opposed discs 530 so as to provide friction coupling therewith. The friction force thus obtained is utilized for balancing the arm assembly at a desired position with the help of a counterbalancing spring force, the detail of which will be discussed later. The friction force can be easily adjusted by adjusting screw 522 which extends from outwardly of the one bracket cover 520 through center holes 531 in discs 530 and comes into threaded engagement with a boss 511 projecting inwardly of the other bracket cover 510. That is, tightening of adjusting screw 522 will press discs 530 stronger against the wall of outer tubular arm 560 and vice versa.

Figure 34:
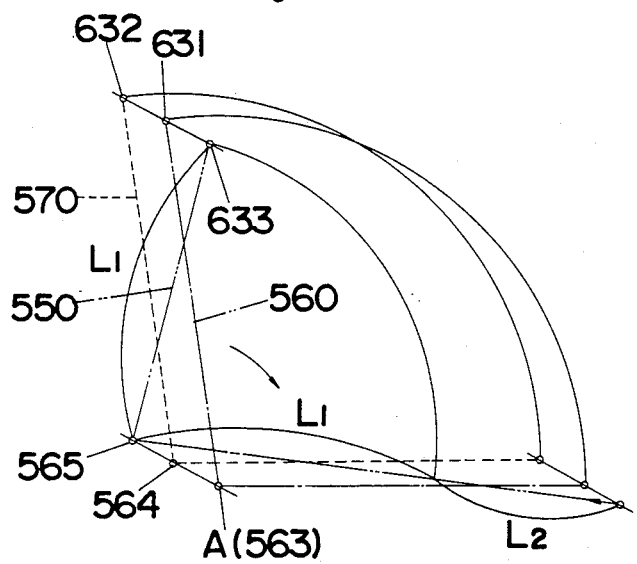
FIG. 34 is a diagram schematically illustrating the operation of the lower arm in combination with the tension spring adapted thereto for counterbalancing the arm of the movable stand.

Also enclosed within outer tubular arm 560 is a spring shaft 550 which extends between bottom and middle brackets 504 and 505 with its ends pivotally supported respectively thereby. Spring shaft 550 comprises a tension spring 580 held between a pair of end pipes 581 and 582 in an aligned relation thereto. A pivot pin 565 extends through hole 545 in discs 530 and through the lower end of pipe 581 for pivotal connection between bottom bracket 504 and spring shaft 550, while pivot pin screws 633 extends through discs 610 of middle bracket 504 and through the upper end of pipe 582. As schematically shown in FIG. 34, spring shaft 550 transverses both the longitudinal axes of outer and inner arms 560 and 570 at an angle such that when the arm assembly swings downwardly from its upright position to a horizontal position about a pivot axis A defined by pivot pin 563, the initial length L1 of spring shaft 550 is elongated by a length L2 to thereby expand spring 580 longitudinally, producing a spring force for counterbalancing arm assembly 502. The above provision of spring shaft 550 transversing both longitudinal axes of arms 560 an 570 is advantageous in obtaining an increased rate of counterbalancing spring force upon the downward swinging movement of the arm assembly.

Figure 30:
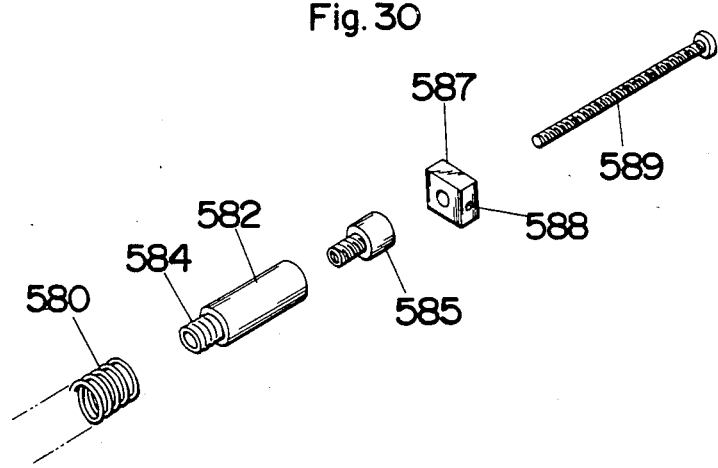
FIG. 30 is an exploded perspective view of the upper portion of a spring shaft with a spring tension adjusting means employed in the above movable stand.
Figure 31:
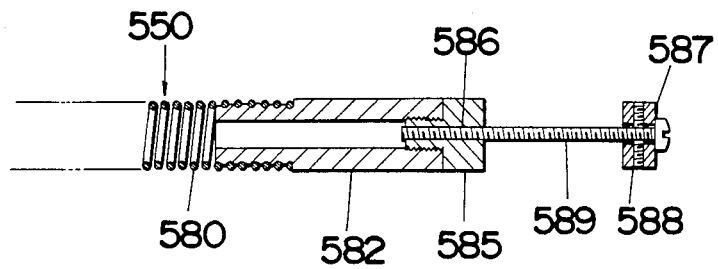
FIG. 31 is a side sectional view of the upper portion of the spring and adjusting means of FIG. 30 with the spring tension being adjusted to a minimum.
Figure 32:
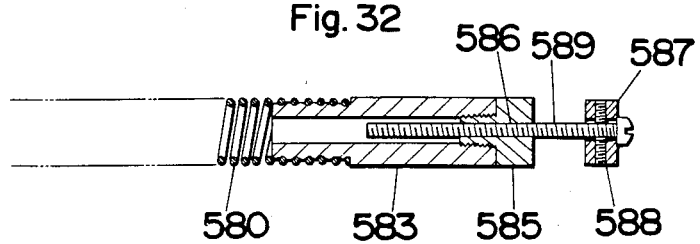
FIG. 32 is a side sectional view of the upper portion of the spring and adjusting means of FIG. 30 with the spring tension being adjusted to a greater value.

As shown in FIGS. 30 to 32, upper end pipe 582, which is connected at its one end to spring 580 by engaging a threaded end 584 therewith, receives in the other end a nipple 585 with an internally threaded axial hole 586. Engagedly extending through axial hole 586 is an adjusting screw 589 which carries adjacent its head an end adapter 587 with a transversely extending hole 588 for pivotal connection of the upper end of spring shaft 550 to discs 610 of middle bracket 505. That is, a pair of pivot pin screws 633 each extending through each of discs 610 engage in the opposite portions of hole 588, as shown in FIG. 27. With this arrangement, the tension force of spring 580 can be adjusted by suitably rotating screw 589 in such a manner as to vary the depth of screw 589 extending into end pipe 582, as shown in FIGS. 30 and 31. Like spring shaft 620 it is also enclosed within the outer tubular arm 640 of the second arm assembly 503 to extend between middle bracket 505 and top bracket 506 for providing a counterbalancing effect upon the second arm assembly 503.

Turning back to FIG. 27, middle bracket 505 comprises, in addition to discs 610, a pair of opposed cup-shaped bracket covers 590 and 600 which are coupled together by means of an adjusting screw 602 in the same manner as in bottom bracket 504 to enclose therebetween discs 610. Each of discs 610 has a first row of holes 611, 612, and 613 for receiving pivot pins 631, 632 and screw 633, respectively. Pin 631 extends through a hole 562 in the upper end of outer tubular arm 560 for pivotal connection of discs 610 thereto, while pin 632 extends through an arcuate groove 566 in each upper end of flat bars 571 of inner arm 570 for pivotal connection of discs 610 thereto, thus completing the first parallel crank arm. Pivot pin screws 633 connected to the upper end of spring shaft 550 are received in an arcuate notch 567 at the upper end of outer tubular arm 560 and is movable therein as the first arm assembly swings.

Also formed in each of discs 610 is a second row of holes 614, 615, and 616 for receiving pivot pins 634, 635, and 636. Pivot pin 634 extends through a bearing hole 641 of the outer tubular arm 640 of the second arm assembly 503 for pivotally supporting the latter on disc 610, while pivot pin 635 extends through holes 651 in the end of inner arm 650 for pivotally supporting the latter on disc 610. Pivot pin 636 extends through a hole 621 at the lower end of spring shaft 620 for pivotal connection between disc 610 and shaft 520.

Figure 33:
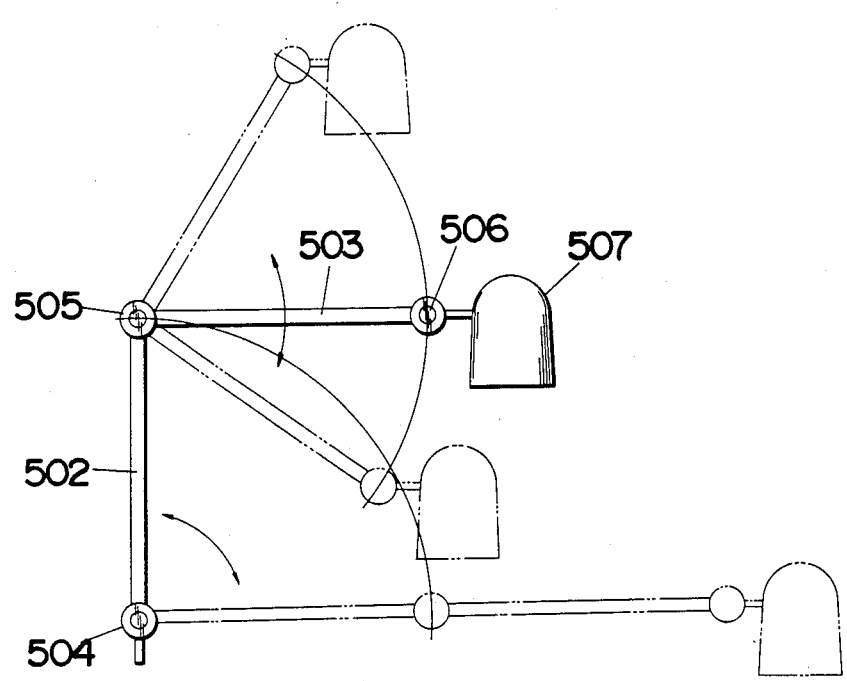
FIG. 33 is a schematic view illustrating the swinging movement of the movable stand of the second embodiment.

The second arm assembly 503 has substantially the same function as the first arm assembly 502 and is cooperative therewith to permit the entire arm assembly to be desirably positioned, as shown in FIG. 33. Top bracket 506, which is pivotally connected at the free end of the second arm assembly 503 for carrying lamp unit 507, has the substantially same construction as bottom bracket 504 and comprises a pair of discs 670 (only one of which is seen in FIG. 28) and a pair of cup-shaped covers 680 and 681 which are coupled together by an adjusting screw 682. Each disc 670 carries a set of pivot pins 671, 672, and 673 respectively for connection with the ends of outer tubular arm 640, inner arm 650, and spring shaft 620. End attachment 683 has its one end hinged to discs 670 of top bracket 506 and has at the other end a mount prop 684 for connection with a coupling member 685 on lamp unit 507.

Figure 35:
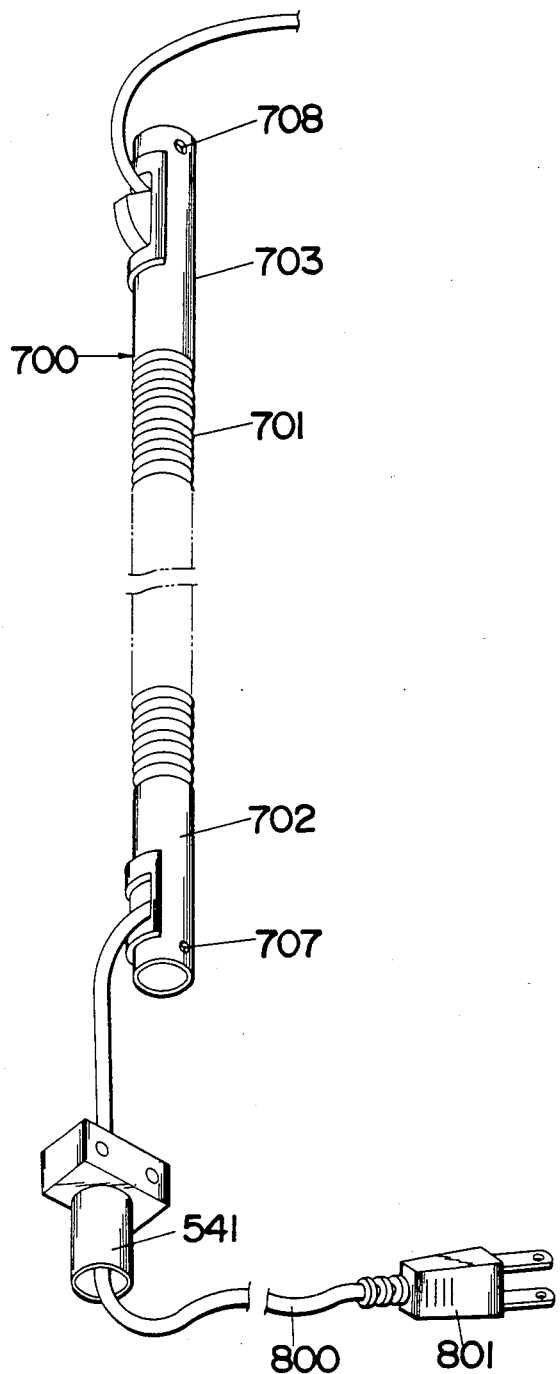
FIG. 35 is a perspective view of another spring shaft adaptable to the movable stand of the second embodiment.
Figure 36:
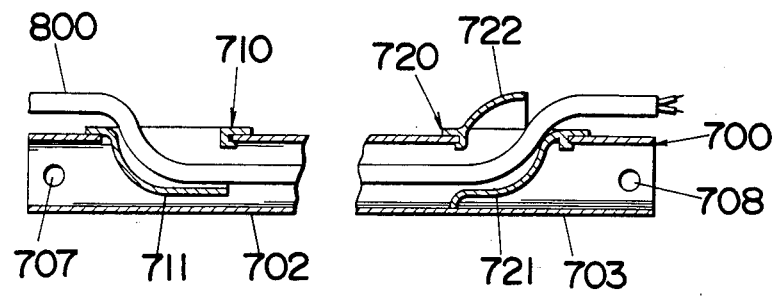
FIG. 36 is a side sectional view, partly being cut away, of the spring shaft of FIG. 35.
Figure 37:
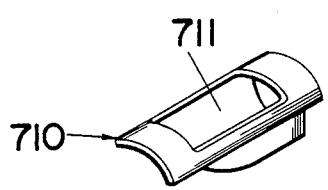
FIGS. 37 and 38 are perspective views respectively of guide members fitted to the spring shaft of FIG. 35 for guiding an electric cord in and out of the spring shaft.
Figure 38:
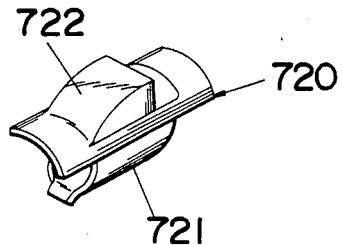

FIG. 35 illustrates an alternative spring shaft 700 which may be substituted for spring shafts 550 and 620 employed in the first and second arm assemblies 502 and 503. Spring shaft 700 is designed for passing therethrough electric cord 800 and comprises a tension spring 701 and a pair of end pipes 702 and 703 connected at either end thereof. Each of end pipes 702 and 703 is formed at its outer end with a hole 707 and 708 for pivotal connection to each one of the adjacent bracket discs. End pipes 701 and 702 are fitted with an inlet bushing 710 and an outlet bushing 720 respectively for guiding electric cord 800 into and out of spring shaft 700. Each of bushing 710 and 720 is made of resilient material such as plastics and is pressed fitted in each of corresponding openings in the lower and upper pipes 702 and 703. Integrally formed with inlet bushing 710 is a curved bottom 711 extending deep into pipe 702 for guiding therealong electric cord 800, as shown in Fig. 36. Outlet bushing 720 is formed integrally with a like curved bottom 721 extending into pipe 703 and a curved top 722 extending outwardly thereof, these curved members defining therebetween a protected passageway for electric cord 800.

Figure 40:
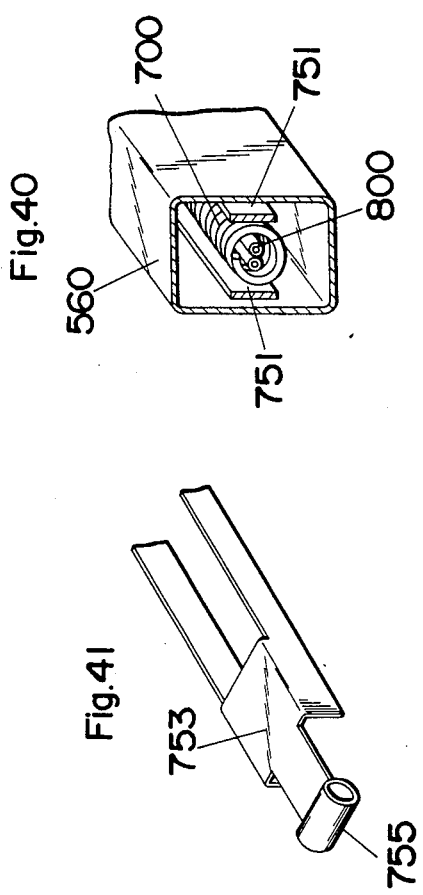
FIG. 40 is a partial view of the portion of a movable stand when adapting the inner arm of FIG. 39.
Figure 39:
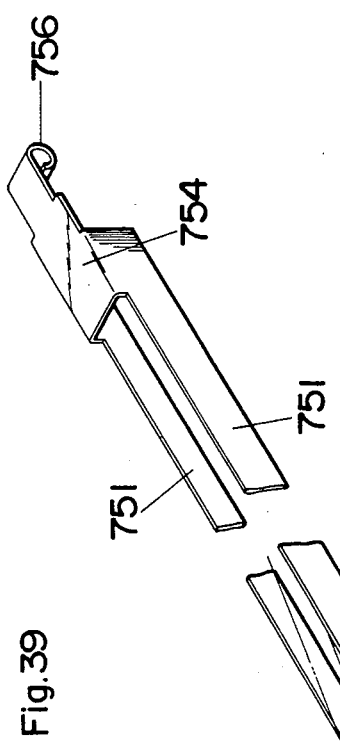
FIG. 39 is a perspective view illustrating a modified inner arm adaptable to the movable stand of the second embodiment.
Figure 41:
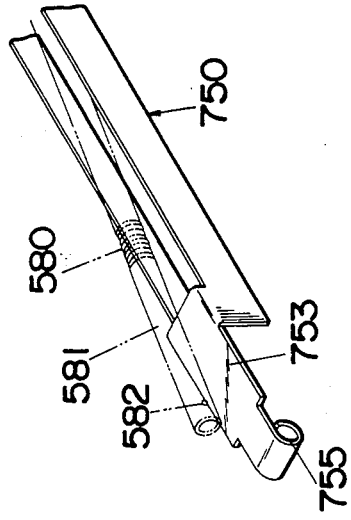
FIG. 41 is a partial perspective view illustrating a modified pivot end for the inner arm of FIG. 39.

FIG. 39 illustrates a modified inner arm 750 which may be substituted for the inner arm employed in the first and second arm assemblies 502 and 503. In contrast to the inner arm of previous structure, the modified inner arm 750 comprises a pair of side bars 751 which are integrally joined at both ends to form thereat individual end tabs 753 and 754 with hinge loops 755 and 756 for pivotal connection to the adjacent brackets. Spring shaft 550 or 620 is allowed to extend between side bars 751 at an angle in the like manner as in the inner arm 570 of the previous structure. FIG. 40 illustrates, in partly cross section, of a portion of the arm assembly when the inner arm 750 is utilized along with spring shaft 750 of FIG. 35 receiving therethrough the electric cord 800. Although hinge loops 755 and 756 are formed integrally with the inner arm 750 in the above modification, they may be separately formed and then welded to the corresponding end members as shown in FIG. 41.

What is claimed is:
1. A movable stand comprising:
   a first parallel crank arm assembly including a first pair of parallel arms, first and second brackets positioned at opposite ends of said arms, each end of each of said arms being pivotally connected to their adjacent brackets whereby defining a parallel crank with said arms and said brackets;
   a base associated with said first bracket for supporting said first arm assembly;
   one of said first pair of arms being of a tubular configuration which encloses therein the other of said first pair of arms in order to conceal the latter arm within the length of the former tubular arm;
   a second parallel crank arm assembly which comprises a second pair of arms pivotally connected at one end to said second bracket and a third bracket pivotally connected to the other ends of said second pair of arms whereby defining a second parallel crank with said second pair of arms and the second and third brackets;
   an end attachment on the third bracket for mounting an object to be supported by the movable stand;
   one of the second pair of arms being of tubular configuration which encloses therein the other of the second pair of arms in order to conceal the latter arm within the length of the former tubular arm; and
   first and second spring means each of which exerts a counterbalancing effect upon each of said first and second pairs of arms for holding the first and second arm assemblies at a desired angular position with respect to the base and the first arm assembly respectively, each of said spring means being enclosed within the one tubular arm of each of said first and second arm assemblies together with the other arm thereof;
   each of said first and second spring means comprising a coil spring, a bar, and a slider, said coil spring being fitted around the other arm of each of said first and second arm assemblies with its one end anchored to said other arm, the other end of the spring being connected to said slider which is slidable along the length of the other arm, and said bar connecting the slider to the adjacent bracket at an angle with respect to the longitudinal axis of said one arm of each of said first and second arm assemblies such that when the first and second arm assemblies are swung downwardly the spring is stressed longitudinally of the other arm to thereby transmit to the arm assemblies the spring force counterbalancing the gravity force acting on the arm assemblies.

2. A movable stand as set forth in claim 1, wherein said other arm of each of said first and second arm assemblies has its portion being formed circular in cross section with a diameter slightly less than the diameter of the coil spring wound therearound and wherein said slider comprises a guide bushing which has an outer configuration to be in sliding engagement with the internal surfaces of said one tubular arm of each of said first and second arm assemblies so that the coil spring is stressed longitudinally of the other arm as being guided by the guide bushing and circular portion of said other arm, whereby preventing the coil spring from being substantially distorted laterally during its stressing movement.

3. A movable stand as set forth in claim 1, wherein said bar is pivoted to the adjacent bracket at a point spaced opposite of the pivotal connection of said one tubular arm with the same bracket away from the pivotal connection of said other arm with the same bracket.

4. A movable stand as set forth in claim 3, wherein said bar is arcuate with its convex adjacent to the other arm so that the bar intersect the longitudinal axis of said one tubular arm at a point closer to its pivotal connection with the adjacent bracket.

5. A movable stand as set forth in claim 3, wherein said bar is of flat configuration with its flat surface disposed in the plane of the angular movement thereof.

6. A movable stand comprising:
   a first parallel crank arm assembly including a first pair of parallel arms, first and second brackets positioned at opposite ends of said arms, each end of each of said arms being pivotally connected to their adjacent brackets whereby defining a parallel crank with said arms and said brackets;
   a base associated with said first bracket for supporting said first arm assembly;
   one of said first pair of arms being of a tubular configuration which encloses therein the other of said first pair of arms in order to conceal the latter arm within the length of the former tubular arm;
   a second parallel crank arm assembly which comprises a second pair arms pivotally connected at one ends to said second bracket and a third bracket pivotally connected to the other ends of said second pair of arms whereby defining a second parallel crank with said second pair of arms and the second and third brackets;
   an end attachment on the third bracket for mounting an object to be supported by the movable stand;

one of the second pair of arms being of tubular configuration which encloses therein the other of the second pair of arms in order to conceal the latter arm within the length of the former tubular arm; and first and second spring means each of which exerts a counterbalancing effect upon each of said first and second pairs of arms for holding the first and second arm assemblies at a desired angular position with respect to the base and the first arm assembly respectively, each of said spring means being enclosed within the one tubular arm of each of said first and second arm assemblies together with the other arm thereof;

said other arm of at least said first arm assembly being provided along its length with a sheath and said spring means comprises a coil spring, a bar, and a slider, said coil spring being received within the sheath of the other arm with its one end anchored to the other arm, the other end of the spring being connected to said slider which is slidable along the length of sheath, and said bar connecting the slider to the adjacent bracket at an angle with respect to the longitudinal axis of said one arm such that when the arm assembly swings downwardly the spring is stressed longitudinally of the other arm to thereby transmit to the arm assembly the spring force counterbalancing the gravity force acting on the arm assembly.

7. A movable stand comprising:

a parallel crank arm assembly including a pair of arms, first and second brackets positioned at opposite ends of said arms, each end of each of said arms being pivotally connected to their adjacent brackets whereby defining a parallel crank with said arm and brackets;

a base associated with said first bracket for supporting said arm assembly;

an end attachment operatively connected to said second bracket for mounting an object to be movably supported by the stand;

one of said arms being of a tubular configuration which encloses therein the other arm in order to conceal the other arm within the length of the one arm; and spring means which exerts a counterbalancing spring force upon the pair of said arms for holding the arm assembly at a desired angular position with respect to the base, said spring means being enclosed within said one tubular arm of the arm assembly together with the other arm thereof;

said spring means comprising a tension spring which is connected at its opposite ends to the adjacent brackets respectively, said spring transversing both the longitudinal axes of the arms at an angle such that when the arm assembly is swung downwardly the spring is expanded longitudinally to thereby transmit to the arm assembly the spring force counterbalancing the gravity force acting on the arm assembly.

8. A movable stand as set forth in claim 7, wherein said spring means includes means for adjusting the spring force applied to the arm assembly.

9. A movable stand as set forth in claim 7, wherein said tension spring is a coil spring through the length of which an electric cord passes for electrical connection with the object to be supported by the stand.

10. A movable stand comprising:

a first parallel crank arm assembly including a first pair of parallel arms, first and second brackets positioned at opposite ends of said arms, each end of each of said arms being pivotally connected to their adjacent brackets whereby defining a parallel crank with said arms and said brackets;

a base associated with said first bracket for supporting said first arm assembly;

one of said first pair of arms being of a tubular configuration which encloses therein the other of said first pair of arms in order to conceal the latter arm within the length of the former tubular arm;

a second parallel crank arm assembly which comprises a second pair of arms pivotally connected at one ends to said second bracket and a third bracket pivotally connected to the other ends of said second pair of arms whereby defining a second parallel crank with said second pair of arms and the second and third brackets;

an end attachment on the third bracket for mounting an object to be supported by the movable stand;

one of the second pair of arms being of tubular configuration which encloses therein the other of the second pair of arms in order to conceal the latter arm within the length of the former tubular arm;

said first bracket comprising a disc and a pair of opposed cup-shaped members which are extensions respectively of said one tubular arm and said base, said disc fixed to said base through the associated cup-shaped member thereof and carrying a first pivot pin for pivotal connection with the other arm, said cup-shaped members being coaxially pivoted to each other through a second pivot pin which provides for said pivotal connection between said one tubular arm and said disc.

11. A movable stand as set forth in claim 10, wherein the one of said cup-shaped member includes a stopper pin which is movable therewith and relative to the other cup-shaped member, said stopper pin projecting at a position radially offset from said second pivot pin and extending in an arcuate path formed in the other cup-shaped member so as to be movable within a limited angular range defined by said arcuate path, limiting the angular movement of the arm assembly about said second pivot pin.

12. A movable stand as set forth in claim 10, wherein the portion of said other arm of the first pair of arms extending into between said cup-shaped members is formed to be of flat configuration.

13. A movable stand as set forth in claim 10, wherein said cup-shaped member associated with the tubular arm is formed with a port which communicates with the interior of said one tubular arm for passing an electric cord therethrough from outside of the cup-shaped member to the object supported on the stand for electrical connection therewith.

14. A movable stand comprising:

a first parallel crank arm assembly including a first pair of parallel arms, first and second brackets positioned at opposite ends of said arms, each end of each of said arms being pivotally connected to their adjacent brackets whereby defining a parallel crank with said arms and said brackets;

a base associated with said first bracket for supporting said first arm assembly;

one of said first pair of arms being of a tubular configuration which encloses therein the other of said first pair of arms in order to conceal the latter arm within the length of the former tubular arm;

a second parallel crank arm assembly which comprises a second pair of arms pivotally connected at one ends to said second bracket and a third bracket pivotally connected to the other ends of said second pair of arms whereby defining a second parallel crank with said second pair of arms and the second and third brackets;

an end attachment on the third bracket for mounting an object to be supported by the movable stand;

one of the second pair of arms being of tubular configuration which encloses therein the other of the second pair of arms in order to conceal the latter arm within the length of the former tubular arm;

said first bracket comprising a disc and a pair of opposed cup-shaped members which are extensions respectively of said one tubular arm and said base, said disc fixed to said base through the associated cup-shaped member thereof and carrying a first pivot pin for pivotal connection with the other arm, said cup-shaped members being coaxially pivoted to each other through a second pivot pin which provides for said pivotal connection between said one tubular arm and said disc;

said second pin being associated with friction means which thrusts said cup-shaped members along the axis of said second pin in order to provide frictional engagement therebetween, which frictional engagement serving to develop the friction force resisting against the swinging movement of the arm assembly about said second pivot pin with respect to said base.

15. A movable stand as set forth in claim 14, wherein said friction means includes means for adjusting the friction force applied between the mating surfaces of said cup-shaped members.

16. A movable stand as set forth in claim 15, wherein said friction means comprises said second pivot pin, an adjusting screw and a friction ring interposed between the peripheries of said cup-shaped members, said second pivot pin has at its one end a head resting on the external surface of one of the cup-shaped members, the other end of second pivot pin being formed with a threaded counter bore in which said adjusting screw is screwed in with its head resting on the external surface of the other cup-shaped member.

17. A movable stand comprising:

a first parallel crank arm assembly including a first pair of parallel arms, first and second brackets positioned at opposite ends of said arms, each end of each of said arms being pivotally connected to their adjacent brackets whereby defining a parallel crank with said arms and said brackets;

a base associated with said first bracket for supporting said first arm assembly;

one of said first pair of arms being of a tubular configuration which encloses therein the other of said first pair of arms in order to conceal the latter arm within the length of the former tubular arm;

said first bracket comprising a first disc and a first pair of opposed cup-shaped members which are extensions respectively of said one tubular arm of said first pair base through the associated cup-shaped member and carrying a first pivot pin for pivotal connection with the other arm of said first pair of arms, said first pair of opposed cup-shaped members being coaxially pivoted to each other through a second pivot pin which provides for said pivotal connection between said one tubular arm and said disc;

said second pivot pin being associated with friction means which thrusts said first pair of opposed cup-shaped members along the axis of said second pivot pin in order to provide frictional engagement therebetween, which frictional engagement serving to develop the friction force resisting against the swinging movement of the first arm assembly about said second pivot pin with respect to said base;

a second parallel crank arm assembly which comprises a second pair of arms pivotally connected at one ends to said second bracket and a third bracket pivotally connected to the other ends of said second pair of arms whereby defining a second parallel crank with said second pair of arms and the second and third brackets;

an end attachment on the third bracket for mounting an object to be supported by the movable stand;

one of the second pair of arms being of tubular configuration which encloses therein the other of the second pair of arms in order to conceal the latter arm within the length of the former tubular arm;

said second bracket comprising a second disc and a second pair of opposed cup-shaped members which are extensions respectively of said one tubular arm of said first pair of arms and the one tubular arm of said second pair of arms, said second disc carrying a third pivot pin for said pivotal connection of the second bracket with the other arm of said first pair of arms and being held between the second pair of cup-shaped members to be movable relative thereto;

said second pair of cup-shaped members being coaxially pivoted to said second disc through a fourth pivot pin which provides for said pivotal connection of the one tubular arm of said first pair of arms with the second bracket as well as for said pivotal connection of the one tubular arm of said second pair of arms with the second bracket, whereby the second arm assembly can swing with respect to said first arm assembly about said fourth common pivot pin; and said second disc carrying a fifth pivot pin for said pivotal connection with the other arm of said second pair of arms with said second bracket.

18. A movable stand as set forth in claim 17, wherein said second pair of opposed cup-shaped members are coupled through said second disc with a slight clearance left between the outer peripheral portions thereof, one of said second pair of cup-shaped members being formed on its outer peripheral portion with a fringe which projects into a recess formed in the confronting surface of the outer periphery of the other of said second pair of cup-shaped members such that said clearance has a zig-zag configuration inhibiting the exposure of the interior of said cup-shaped members through the clearance.

19. A movable stand comprising:

a first parallel crank arm assembly including a first pair of parallel arms, first and second brackets positioned at opposite ends of said arms, each end of each of said arms being pivotally connected to their adjacent brackets whereby defining a parallel crank with said arms and said brackets;

a base associated with said first bracket for supporting said first arm assembly;

one of said first pair of arms being of a tubular configuration which encloses therein the other of said first pair of arms in order to conceal the latter arm within the length of the former tubular arm;

a second parallel crank arm assembly which comprises a second pair of arms pivotally connected at one end to said second bracket and a third bracket pivotally connected to the other ends of said pair of arms whereby defining a second parallel crank with said second pair of arms and the second and third brackets;

an end attachment on the third bracket for mounting an object to be supported by the movable stand;

one of the second pair of arms being of tubular configuration which encloses therein the other of the second pair of arms in order to conceal the latter arm within the length of the former tubular arm;

said second bracket comprising a second disc and a second pair of opposed cup-shaped members which are extensions respectively of said one tubular arm of said first pair of arms and the one tubular arm of said second pair of arms, said second disc carrying a third pivot pin for said pivotal connection of the second bracket with the other arm of said first pair of arms and being held between the second pair of cup-shaped members to be movable relative thereto;

said second pair of cup-shaped members being coaxially pivoted to said second disc through a fourth pivot pin which provides for said pivotal connection of the one tubular arm of said first pair of arms with the second bracket as well as for said pivotal connection of the one tubular arm of said second pair of arms with the second bracket, whereby the second arm assembly can swing with respect to said first arm assembly about said fourth common pivot pin; and said second disc carrying a fifth pivot pin for said pivotal connection with the other arm of said second pair of arms with said second bracket.

20. A movable stand comprising:

a parallel crank arm assembly including a pair of arms, first and second brackets positioned at opposite ends of said arms, each end of each of said arms being pivotally connected to their adjacent brackets whereby defining a parallel crank with said arm and brackets;

a base associated with said first bracket for supporting said arm assembly;

an end attachment operatively connected to said second bracket for mounting an object to be movably supported by the stand;

one of said arms being of a tubular configuration which encloses therein the other arm in order to conceal the other arm within the length of the one arm; and spring means which exerts a counterbalancing spring force upon the pair of said arms for holding the arm assembly at a desired angular position with respect to the base, said spring means being enclosed within said one tubular arm of the arm assembly together with the other arm thereof;

said spring means comprising a coil spring, a bar, and a slider, said coil spring being fitted around the other arm of said assembly with its one end anchored to said other arm, the other end of the spring being connected to said slider which is slidable along the length of the other arm, and said bar connecting the slider to the adjacent bracket at an angle with respect to the longitudinal axis of said one arm of said arm assembly such that when said arm assembly is swung downwardly the spring is stressed longitudinally of the other arm to thereby transmit to the arm assembly the spring force counterbalancing the gravity force acting on the arm assembly.

21. A movable stand as set forth in claim 20, wherein said other arm of said arm assembly has its portion being formed circular in cross section with a diameter slightly less than the diameter of the coil spring wound therearound and wherein said slider comprises a guide bushing which has an outer configuration to be in sliding engagement with the internal surfaces of said one tubular arm of said arm assembly so that the coil spring is stressed longitudinally of the other arm is being guided by the guide bushing and circular portion of said other arm, whereby preventing the coil spring from being substantially distorted laterally during its stressing movement.

22. A movable stand as set forth in claim 20, wherein said bar is pivoted to the adjacent bracket at a point spaced opposite of the pivotal connection of said one tubular arm with the same bracket away from the pivotal connection of said other arm with the same bracket.

23. A movable stand as set forth in claim 22, wherein said bar is of flat configuration with its flat surface disposed in the plane of the angular movement thereof.

* * * * *